United States Patent
Wegner et al.

(10) Patent No.: US 11,673,343 B2
(45) Date of Patent: Jun. 13, 2023

(54) PULSE WELDING METHOD AND WELDING TOOL FOR PULSE WELDING FOR A MEDICAL PACK FORMED AS A BAG

(71) Applicant: Fresenius Kabi Deutschland GMBH, Bad Homburg (DE)

(72) Inventors: Gerald Wegner, Friedberg (DE); Jorn Wittorf, Friedberg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 330 days.

(21) Appl. No.: 16/493,022

(22) PCT Filed: Mar. 23, 2018

(86) PCT No.: PCT/EP2018/057545
§ 371 (c)(1),
(2) Date: Sep. 11, 2019

(87) PCT Pub. No.: WO2018/172554
PCT Pub. Date: Sep. 27, 2018

(65) Prior Publication Data
US 2020/0009800 A1 Jan. 9, 2020

(30) Foreign Application Priority Data
Mar. 24, 2017 (EP) ..................... 17162911

(51) Int. Cl.
*B29C 65/38* (2006.01)
*A61J 1/10* (2006.01)
(Continued)

(52) U.S. Cl.
CPC ............. *B29C 65/38* (2013.01); *A61J 1/10* (2013.01); *B29C 65/224* (2013.01);
(Continued)

(58) Field of Classification Search
CPC ..... B32B 65/38; B32B 65/224; B32B 65/226; B32B 66/1122; B32B 66/232;
(Continued)

(56) References Cited

U.S. PATENT DOCUMENTS

| 1,856,260 | A | | 5/1932 | Hyman |
| 4,856,260 | A | | 8/1989 | Woo et al. |
| 5,993,593 | A | * | 11/1999 | Swartz .................. B29C 65/226 |
| | | | | 156/308.4 |

FOREIGN PATENT DOCUMENTS

| CN | 110545988 A | 12/2019 |
| DE | 68911521 T2 | 7/1994 |

(Continued)

OTHER PUBLICATIONS

English language translation of the Written Opinion in application PCT/EP2018/057545, dated May 29, 2018. (Year: 2018).*

(Continued)

*Primary Examiner* — George R Koch
(74) *Attorney, Agent, or Firm* — Occhiuti & Rohlicek LLP

(57) ABSTRACT

The invention relates to a welding tool and a method for pulse welding films of plastic for medical packs formed as bags. The invention generally provides for the film material that has been plastified during welding, and is consequently free-flowing, to be specifically displaced by increasing the sealing surface area. The displaced film material can for instance compensate for dimensional and form tolerances. At the same time, however, the strength of the welded seam region, which adjoins the interior space of the bag, is not reduced.

18 Claims, 14 Drawing Sheets

(51) Int. Cl.
*B29C 65/22* (2006.01)
*B29C 65/00* (2006.01)
*B29K 23/00* (2006.01)
*B29L 31/00* (2006.01)

(52) U.S. Cl.
CPC ........ *B29C 65/226* (2013.01); *B29C 66/1122* (2013.01); *B29C 66/232* (2013.01); *B29C 66/244* (2013.01); *B29C 66/24244* (2013.01); *B29C 66/346* (2013.01); *B29C 66/43* (2013.01); *B29C 66/53263* (2013.01); *B29C 66/7352* (2013.01); *B29C 66/73921* (2013.01); *B29C 66/8122* (2013.01); *B29C 66/81261* (2013.01); *B29C 66/81427* (2013.01); *B29C 66/81811* (2013.01); *B29C 66/8322* (2013.01); *B29C 66/91423* (2013.01); *B29K 2023/06* (2013.01); *B29K 2023/12* (2013.01); *B29L 2031/7148* (2013.01)

(58) Field of Classification Search
CPC ............ B32B 66/24244; B32B 66/244; B32B 66/346; B32B 66/43; B32B 66/53263; B32B 66/7352; B32B 66/73921; B32B 66/8122; B32B 66/81261; B32B 66/81427; B32B 66/81811; B32B 66/8322; B32B 66/91423; A61J 1/10
See application file for complete search history.

(56) References Cited

FOREIGN PATENT DOCUMENTS

| | | | |
|---|---|---|---|
| FR | 2544612 | 10/1984 | |
| JP | 2007007128 A | * 1/2007 | ............. B29C 65/18 |
| JP | 2011177443 | 9/2011 | |
| JP | 2011177443 A | * 9/2011 | |
| JP | 5498818 B2 | 5/2014 | |

OTHER PUBLICATIONS

Translation of JP-2011177443-A, Sep. 2011, Inventor Yuki Fujii (Year: 2011).*
Translation of JP-2007007128-A, Jan. 2007, Inventors: Keita Mihira, Sada Shirakuma, Tsutomu Yoneda, Hidekatsu Shoji, Minoru Oka, Junji Kaga, Yoshifumi Fujimoto (Year: 2007).*

* cited by examiner

Detail A

PULSE WELDING METHOD AND WELDING TOOL FOR PULSE WELDING FOR A MEDICAL PACK FORMED AS A BAG

CROSS REFERENCE TO RELATED APPLICATIONS

This application is the national phase under 35 USC 371 of international Application No. PCT/EP2018/057545, filed Mar. 23, 2018, which claims priority to European patent application 17162911.6 filed Mar. 24, 2017.

AREA OF THE INVENTION

The invention relates to a welding tool for pulse welding of plastic films for medical packs formed as a bag. Moreover, the invention relates to a welding method using the welding tool for pulse welding. The invention furthermore relates to a medical pack formed as a bag, which is preferably produced using the method according to the invention.

BACKGROUND OF THE INVENTION

Medical bags consisting of a welded film are known. For example, polyolefin films are used to produce such medical packs.

The published application EP 0 911 141 A2 (Fresenius Medical Care Deutschland GmbH) discloses a device and a method for welding films for the purpose of producing a medical pack. According to the teaching of this document, the welding jaws comprise a heated region and an adjoining cooled region. The welding jaws are pressed onto the film during the welding process. Because of the adjoining cooled region, the welding jaws always rest on a region of non-plasticized film during this welding process, so that the welding jaws are held apart from one another by the film itself. The material of the weld seam is prevented from being displaced to the sides in this manner.

The films thus have essentially the same material thickness in the region of the weld seams as the total thickness of the adjoining films lying one on top of another.

Furthermore, welding a port for removing or supplying liquids into the weld seam to produce medical packs formed as bags is known. A port is a fitting system for removing or supplying liquids. Such a port can be provided, for example, by a hose section or by an injection-molded part. Such a port can comprise, for example, a ship-shaped welded-in portion for this purpose. Such a ship-shaped welded-in portion is disclosed, for example, in the patent specification EP 1 605 891 B1 (Fresenius Kabi Deutschland GmbH).

In particular in the region of the port, high demands are placed on the dimensional accuracy of the parts used for this purpose.

OBJECT OF THE INVENTION

The invention is therefore based on the object of providing a welding tool and a welding method and also a medical pack produced using a welding method according to the invention, which permit higher shape tolerances of the materials used, but at the same time maintain the positive pack properties.

SUMMARY OF THE INVENTION

The object of the invention is achieved by a welding tool, a method for welding a film, and a medical pack formed as a bag according to one of the independent claims.

Preferred embodiments of the invention can be inferred from the subject matter of the dependent claims, the description, and the drawings.

In general, the invention provides that film material, which is plasticized by heating and is thus free-flowing during welding, is intentionally displaced by an increase of the sealing surface. The displaced film material can compensate for shape and/or dimensional tolerances. At the same time, however, the thickness of the weld seam region which adjoins the interior of the bag is not substantially reduced.

The invention provides a welding tool for pulse welding a film made of plastic of a pack, which is preferably medical. The welding tool comprises a welding jaw having a sealing strip, which extends along the welding jaw and can be pressed onto the film. The sealing strip comprises a heatable sealing surface to form a weld seam, in order to plasticize plastic material of the film adjoining the sealing surface. In particular, the sealing strip has an adjoining inner clamping region and preferably also an adjoining outer clamping region on the periphery of the sealing surface for clamping the film during welding of the film. Therefore, a cavity is formed in the welding tool in particular during the welding. The welding tool is in particular characterized in that the sealing surface has an elevation. The elevation is preferably an elevation for displacing plastic material of the film which is or has been plasticized during the welding procedure.

Plasticized plastic material of the film can be intentionally displaced by the elevation in the sealing surface. The displaced film material can compensate for shape and/or dimensional tolerances. The plastic material can in particular be displaced at least laterally along the weld seam. The elevation can be provided by a profile of the sealing surface. It can be provided, for example, by a structure that is convex at least in sections or by a type of step.

The elevation in the sealing surface is in particular not capable of or designed for severing films inside the weld seam. The elevation in the sealing surface is not and does not have a blade for severing the film. The elevation in the sealing surface is substantially used for the intentional shifting of the plasticized plastic material. The welding tool is preferably not a welding tool for welding and cutting.

In a first embodiment, the elevation is provided by a plateau, which protrudes out of a surface of the sealing surface. The plateau can be embodied level, inclined, and/or curved completely or in sections.

In one embodiment of the invention, the plateau is provided as a strip-shaped contour on the sealing surface. In particular, the plateau occupies 30% to 80%, preferably 60% to 75%, of the width of the weld seam. In particular, the plateau is provided at a height between 10 and 100 μm, preferably between 20 and 60 μm.

In one preferred embodiment, a peripheral inner region of the sealing surface is arranged depressed in relation to the elevation. The inner region of the sealing surface is in particular the region of the sealing surface which produces the peripheral inner region of the weld seam. The inner region of the weld seam is the region which adjoins the interior of the bag. A weld seam can thus be produced which has a greater thickness on its inner side. Such a weld seam is thus embodied so it is more stable. A filled bag of this type has greater strength upon application of pressure.

In particular, a peripheral outer region of the sealing surface can also be arranged depressed in relation to the elevation. The outer region of the sealing surface is in particular the region of the sealing surface which produces the peripheral outer region of the weld seam. The outer region of the weld seam is the region which adjoins the exterior or the surroundings of the bag. A weld seam can thus be produced, which has a greater thickness both on its inner side and also on its outer side and is thus embodied so it is more stable overall.

The plateau can be arranged in the sealing surface, preferably approximately centrally. However, it can also be arranged in the outer region of the sealing surface.

In a further embodiment, the sealing strip has an adjoining inner clamping region and/or an adjoining outer clamping region peripherally in relation to the sealing surface for clamping the film during welding of the film. A cavity is thus formed in the welding tool during the welding.

The inner clamping region and/or the outer clamping region is/are preferably provided during the welding with a temperature which is less than a plasticizing temperature of the film to be welded. The plastic material plasticized in the region of the sealing surface thus cannot flow into the clamping region. A more or less completely closed cavity is thus formed.

In a further embodiment of the invention, the peripheral inner region of the sealing surface and/or the peripheral outer region of the sealing surface is/are located substantially at one height with the respective adjoining clamping region. The peripheral weld seam region can thus be produced having a thickness which substantially corresponds to the film thickness.

At least a free material flow oriented laterally (along the weld seam) is enabled in particular by the combination of clamping region and profile (for example, as a plateau) to compensate for manufacturing tolerances of the components (film, port, . . . ), without changing the original film thickness in the transverse direction (transversely in relation to the weld seam) or producing uncontrolled material expulsion.

The welding tool comprises at least one, preferably two welding jaws, which can be pressed onto a film. One welding jaw or the welding jaws of the welding tool, in particular the sealing surface and/or clamping region thereof, is/are preferably pressed directly onto the films. It is or they are in direct contact with the film to be welded. The two welding jaws are preferably designed substantially identically. The welding tool is thus constructed substantially symmetrically in one embodiment.

The sealing surface extends over the welding jaw along the longitudinal axis of the welding jaw. The sealing surface can be heated so as to heat and melt a plastic material of the film to be welded which adjoins the sealing surface.

According to a further embodiment of the invention, the welding tool comprises a membrane, which bulges upon heating and which at least comprises the sealing surface.

Bulging upon heating is understood as bulging of the sealing surface in the unloaded state, i.e., when it is not held back by a counterforce, which is present, for example, because of the material of the weld seam which cannot be displaced.

During a welding procedure, the membrane thus bulges in particular if material can flow into the weld seam and can compensate in particular for cavities because of manufacturing-related shape tolerances at the same time.

The block, which the membrane is preferably part of, is manufactured according to one embodiment of the invention from a material having low thermal longitudinal expansion, in particular from an iron-nickel alloy.

Preferably, at least the part of the block which comprises the sealing strip and/or the membrane consists of a material having a coefficient of thermal longitudinal expansion α at 20-300° C. of less than 10, preferably of less than 5, and particularly preferably of less than $2*10^{-6}$/K.

Furthermore, according to one embodiment of the invention, the welding tool comprises a cooling element, which is cooled in particular using liquid. An electrical heating conductor is placed on the cooling element. An upper part having the sealing strip is preferably placed on the cooling element.

In particular, the cooling element comprises a protrusion, which protrudes into the block having the sealing strip and/or the membrane and/or on which the heating conductor is placed. The heating conductor is thus arranged directly adjoining the sealing strip and/or the membrane and is preferably in direct contact with the sealing strip and/or the membrane.

It is obvious that an electrical insulation is to be provided between the heating conductor and the sealing strip and/or the membrane for this purpose.

In particular, it is provided that the sealing strip and/or the membrane, preferably the entire underside of the block, is provided with an insulating coating, in particular with an electrically insulating oxide layer and/or ceramic layer, for example, a metal or metalloid, in particular a silicon oxide layer. The insulating layer preferably has a thickness of less than 50 μm, particularly preferably less than 10 μm. It is in particular a layer deposited by means of a plasma method.

In a further embodiment of the invention, the welding tool comprises an upper part having recesses. They are formed to accommodate the welded-in portion, preferably the ship-shaped welded-in portion of the port. In this case, the welding tool is designed in such a way that the sealing surface is hotter and/or can be heated more strongly in the region of the welded-in portion than in an adjoining region of the sealing surface, in which two opposing films are welded to one another.

During operation of the heating conductor, the sealing surface is thus heated more strongly in the region of the welded-in portion of a port, in particular at least temporarily by at least 20° C. Since the welding jaw and thus the sealing surface are not directly opposing and are only opposing by the two films separated from the other sealing surface of the opposing welding jaw in the region of the port, in particular in its welded-in portion, a higher introduction of energy is advantageous in this region to thus also plasticize the material approximately equally quickly in this region. A one-step production process is thus enabled. The port can simultaneously also be welded into the weld seam during the production of the weld seam.

Various technical solutions are possible in order to achieve this.

According to one embodiment, the heating conductor itself can be tapered in its cross section in the region of the recess, so that it becomes hotter in the region in which the ship-shaped welded-in portion is to be bonded to the film.

According to a further embodiment, the welding jaw, in particular the sealing strip and/or the membrane of the welding jaw, can be formed somewhat thinner in the region of the recesses for the port, so that an improved heat transfer from the heating conductor to the sealing surface is provided here.

According to a further embodiment, the following is provided: To heat the sealing surface in the port region more strongly, the thickness of an insulating layer, in particular a silicone layer, via which the heating conductor is connected to a cooling element, is selected to be somewhat greater in this region. The heating conductor is thus cooled more poorly in the region of the recesses for the port, which results in a higher temperature upon heating.

In a further embodiment of the invention, the sealing surface comprises at least one protruding ribs, preferably at least two protruding ribs, in the region of a port to be welded in, in particular in the region of the ship-shaped welded-in portion for a port.

In particular, ribs are provided which are 0.5-1.5 mm wide and/or which are 10-60 µm tall. Material is additionally caused to flow in the region of the ship-shaped welded-in portion of the port by these ribs and thus in particular cavities, for example, because of manufacturing tolerances of the port, are filled up.

The invention furthermore relates to the use of the above-described welding tool for producing a medical pack formed as a bag.

The above-described welding tool can preferably also be used in the method described hereafter.

In general, the invention also relates to a method for welding a film made of plastic. In particular, the invention relates to a pulse welding method for welding the film of a medical pack.

The present invention is also described by a pulse welding method using a welding tool for pulse welding a film made of plastic of a pack, which is preferably medical. In particular, the above-described welding tool is used for this purpose in the method. In this case, one welding jaw of the welding tool having a heatable sealing surface for forming a weld seam is pressed onto the film in such a way that the film is clamped peripherally in relation to the sealing surface during the welding procedure by a clamping region, which is cooler than the sealing surface and extends on the periphery of the sealing surface, and plasticized plastic material of the film is displaced by an elevation of the sealing strip along the weld seam, preferably at least laterally, preferably to compensate for shape and/or dimensional tolerances, wherein the film thickness is maintained or substantially maintained in a peripheral inner region of the weld seam. Because the film is clamped peripherally in relation to the sealing surface during the welding procedure by the clamping region, which is cooler than the sealing surface and extends peripherally on the sealing surface, in particular a cavity is formed in the welding tool during the welding. The plasticized plastic material of the film can be displaced inside the cavity formed.

At least a free material flow oriented laterally (along the weld seam) is enabled in particular by the combination of the clamping region and the contour of the sealing surface to compensate for manufacturing tolerances of the components (film, port, . . . ), without substantially changing the original film thickness or producing uncontrolled material expulsion in the transverse direction (transversely in relation to the weld seam). In particular, complete welding of all components takes place as long as the entirety of all tolerance deviations is less than the displacement volume of the elevation.

The clamping region is sufficiently cooler or cool that it is provided at a temperature which is less than the plasticizing temperature of the film to be welded. In particular, the temperature of the clamping region is at most approximately 20° C. above room temperature during the welding.

The film thickness is the thickness of the film(s), at which the film(s) was/were provided. The film thickness in the peripheral inner region of the weld seam is maintained, preferably substantially, if it deviates by at most ±10% in relation to the thickness of the film(s) at which the film(s) was/were provided.

Preferably, the plasticized plastic material can be displaced by the elevation of the sealing strip not only laterally but rather also into a peripheral inner region of the weld seam and in particular also into a peripheral outer region of the weld seam.

In one embodiment, the elevation of the sealing surface is provided by an elevation in the sealing surface. The elevation is a structural elevation here, which protrudes out of a surface of the sealing surface. The elevation is preferably provided by a plateau, which protrudes out of a surface of the sealing surface. Further explanations on the plateau and possible embodiments are set forth in the above description and the following description.

In an alternative or additional embodiment, the elevation of the sealing surface is provided by a bulging membrane, wherein the membrane comprises the sealing surface. Further explanations on the membrane and possible embodiments are set forth in the following description.

During the welding, a welding jaw having a heatable sealing surface is pressed onto the film, wherein the film is clamped peripherally in relation to the sealing surface during the welding procedure in a clamping region of the welding jaw.

In one embodiment, at least one welded-in portion of a port is also welded into the weld seam, preferably simultaneously. The welded-in portion of the port is preferably provided by a ship-shaped welded-in portion. The welded-in portion can also be provided by a type of tube section or hose section, however.

During the welding procedure, a force is preferably exerted on the film by a surface pressure of both the sealing surface and also a clamping region peripherally adjoining the sealing surface.

The clamping jaw is in particular pressed on sufficiently strongly that an average force over the sealing surface and the clamping region of 0.05 to 5, preferably of 0.1 to 1 N/mm$^2$, results at least at the beginning of the welding procedure.

Due to the clamping of the film in the clamping region, the film is a spacer for the clamping jaws during the welding procedure. In the clamping region, the tool is held apart by the films, so that a closed cavity, which is to be found comparably in an injection-molding process, forms inside the weld seam, for example, between two opposing sealing surfaces or between the sealing surface and the ship-shaped welded-in portion of the port. This has the result that the plasticized, in particular molten plastic material is not significantly pressed adjacent to the weld seam.

The sealing surface is firstly heated during a welding procedure, so that the plastic material adjoining the sealing surface plasticizes to form an integrally-joined bond. The heating is then switched off and, as soon as the plastic material has solidified, the welding jaw is raised. Plasticizing of the plastic material is understood as heating in such a way that the plastic at least begins to enter a molten state, so that it can form an integrally-joined bond.

According to one embodiment of the invention, a higher surface pressure is exerted in the region of the sealing surface than in the clamping region during the heating of the sealing surface. The displacement or flowing of the plasticized film material can thus be assisted.

According to this embodiment of the invention, surface pressure having substantially equal force per unit of area over both the clamping region and also the sealing surface is thus not exerted during the welding procedure, but rather a higher force per unit of area is exerted in the region of the sealing surface. The force in the region of the sealing surface is preferably 1.5 times higher than in the adjoining clamping region at least temporarily and at least in sections.

In this way, a closed cavity furthermore forms in the region of the weld seam, on the one hand.

At the same time, a pressure builds up inside this closed cavity because of the greater surface pressure in a molten material, on the other hand, so that the molten material can flow if a volume is present for this purpose. Such a volume can be present due to manufacturing-related tolerances, for example. Such tolerances can be present in particular on the outer side of the ship-shaped welded-in portion of a port. They are thus filled up in an improved manner by material of the film to be welded. A welding method can thus be provided in a simple manner which permits higher manufacturing tolerances.

The surface pressure converts due to the liquefaction of the plastic material into a pressure in the cavity, which causes molten material in the cavities to flow laterally in particular (in the direction of the weld seam length).

Films, for example, can be bonded to one another by the invention. Welded-in portions, for example, ship-shaped welded-in portions, of a port can also be welded between two films, wherein the films enter a molten state and form an integrally-joined bond with the welded-in portion. Possible collapsed points can be filled up in particular by the greater force per unit of area in the region of the sealing surface, i.e., in the region of the forming weld seam.

The sealing surface is designed in particular as a heatable linear or strip-shaped surface, which is temporarily heated during a welding cycle. The heating of the sealing surface can be performed in particular using a resistance-heated heating conductor.

For welding in the welded-in portion, preferably the ship-shaped welded-in portion, of a port, the sealing surface can have a recess in addition to the adjoining clamping region. The shape of the recess is adapted to the shape of the welded-in portion of a port. In one embodiment of the invention, its shape is adapted to a ship-shaped welded-in portion tapering to a point at the edges.

According to one embodiment of the invention, the higher force per unit of area in the region of the sealing surface is exerted by a bulging membrane, which comprises the sealing surface.

A membrane is understood as a preferably thin-walled section of the welding jaw, in particular an upper part of the welding jaw.

The membrane is preferably peripherally fixed. As soon as the membrane is heated during a welding cycle, it expands and bulges forward, at least if no counterforce results, i.e., in the direction of the film, onto which pressure is thus exerted. The membrane preferably rests with its lower side on a heating wire in particular. Bulging is thus only possible forward.

The force per unit of area in the region of the sealing surface and thus the pressure inside the closed cavity in which the weld seam is located or formed, can thus be elevated in a simple manner.

The method according to the invention is in particular a pulse welding method. In one embodiment, the cycle time, i.e., the time for placing on the welding tool, heating the sealing surface, cooling and lifting off the welding tool, is less than 10, preferably less than 8, and particularly preferably less than 5 seconds.

The membrane is designed in particular in such a way that it bulges at least 10 μm, preferably at least 15 μm in the direction of the film in the unloaded state, i.e., without counterforce due to an applied film.

The membrane is preferably part of the upper part of a welding jaw and is preferably formed in one piece with an adjoining region of the upper part.

The upper part is preferably formed as a block which comprises the membrane. The membrane is provided in that the block is thinned out in the region of the membrane.

During a welding procedure, only the sealing surface which is part of the membrane, but not the adjoining clamping region, is heated in such a way that the film which is in contact is plasticized. Because of this, the block does not expand or at least expands less, so that the membrane is tensioned in the transition region to the block and bulges, since the block does not follow the expansion of the membrane.

In a further embodiment of the invention, a welding jaw having a sealing surface is used which has at least one plateau protruding out of a surface of the sealing surface.

The sealing surface, the height of which corresponds peripherally to the height of the clamping region, thus has a thickened region in the form of a plateau.

The plateau is preferably formed as a plate-shaped contour or protrusion, which extends centrally, in particular in the middle, along the main extension direction of the sealing surface.

The surface pressure in the region of the sealing surface is also elevated by the plateau. Furthermore, material which is in the molten state can be set into motion by the plateau and fill up possible cavities in this case.

The plateau preferably occupies 30-80%, particularly preferably 60-75%, of the width of the weld seam. A sufficient amount of molten material may thus be moved, without the film thickness being substantially reduced in the end region of the weld seam.

In one embodiment, the plateau has a height between 10 and 100 μm, particularly preferably between 20 and 60 μm. The plateau is formed in such a way that in spite of the plateau, a surface pressure occurs both over the clamping region and also over the region of the sealing surface during the welding procedure. It is thus also ensured that material is not transversely shifted (in the direction of the seam width) during the welding procedure.

In order to bulge sufficiently, but also not to be formed so thin that the risk of tearing exists, in one embodiment of the invention, the membrane has a thickness of 100-1500 μm, preferably 300-600 μm.

According to one embodiment of the invention, a multilayered film, in particular a multilayered polyolefin film, for example, a polypropylene or polyethylene film is welded. Such multilayer films have improved properties with respect to the tear resistance thereof. It has been shown that in particular also multilayered films can be reliably bonded by the method according to the invention.

The film used for the method preferably has a thickness of 100 to 500 μm, particularly preferably 150 to 300 μm.

Independently of whether a single-layer or multilayered film is used, it is provided according to one embodiment of the invention that the entire film is plasticized during the welding method. In particular, all layers of a multilayer film can be plasticized during the welding method. In this case, all of the material in the region of the weld seam is converted into a molten state, wherein a closed volume is produced in the region of the weld seam by the lateral clamping of the film in the clamping region. Mixing of the layers of the film does not have to occur. The invention can also relate to the use of a multilayer film, however, which has a thin layer made of a material melting at lower temperature, which is used as an adhesive layer. In this embodiment, all of the material in the region of the weld seam does not have to be plasticized.

The invention furthermore relates to a medical pack formed as a bag, which can be produced in particular using the above-described method and in particular utilizing the above-described tool.

The bag comprises films welded to one another. According to the invention, the bag comprises at least one weld seam, which has, at least in sections, a region thinned out or reduced in the thickness in relation to an adjoining neighboring region. The neighboring region is provided by a peripheral inner region of the weld seam. This peripheral inner region of the weld seam is the region of the weld seam which adjoins the interior of the bag. In the case of a filled bag, this region of the weld seam adjoins the liquid contained in the bag, for example. In this case, the peripheral inner region of the weld seam has a thickness which preferably substantially corresponds to a thickness of the film for the case in which a film and a port are welded to one another. For the case in which two films are welded to one another, the weld seam has a thickness which preferably substantially corresponds to a total thickness of the two films.

In one embodiment, the neighboring region can also be provided by a peripheral outer region of the weld seam. The outer region of the weld seam describes the region which adjoins the exterior surroundings. The peripheral outer region of the weld seam preferably has a thickness which substantially corresponds to a thickness of the film or the total thickness of the films.

The thickness of the film describes the film thickness with which the film was provided. The total thickness describes the total of the film thicknesses of the two provided films, which are welded to one another.

The thickness of the weld seam preferably substantially corresponds to the thickness of the film if it deviates by at most ±10%. The thickness of the weld seam preferably substantially corresponds to the total thickness of the two films if it deviates by at most ±10%.

This thinned-out region is formed in particular as the imprint of the above-described elevation, for example, of the plateau described at the outset.

In this region, the weld seam is reduced in the thickness because of the pressure produced by the elevation, for example, by the plateau.

The region which is thinned out or reduced in the thickness extends in particular over a width of 30%-80%, preferably 60%-75%, of the width of the weld seam. The thinned-out region can extend, for example, in a strip shape along a region of the weld seam. It can in particular form a strip along a central, in particular a middle region of the weld seam.

The thickness of the film is preferably reduced in the region which is thinned out or reduced in thickness by at least 10%, preferably 10% to 30%, in relation to the adjoining neighboring region.

The film is preferably 15% to 25% thinner in the thinned-out region than in the adjoining region of the weld seam.

Furthermore, the weld seam can comprise a welded-in port. In particular, the weld seam can comprise a port having a ship-shaped welded-in portion, wherein at least one imprint of a rib, preferably two imprints of two ribs, is/are provided in the region of the ship-shaped welded-in portion.

The weld seam is preferably between 1 and 10 mm, particularly preferably between 3 and 7 mm wide.

A sealing strip producing the weld stream is preferably between 5 and 15, particularly preferably between 6 and 12 mm wide.

Moreover, a pharmaceutical product is also in the scope of the invention. It comprises an embodiment of a medical pack formed as a bag, as described above. The bag is filled with a medical liquid, which preferably contains an active ingredient. A medical liquid is, for example, a liquid to be administered intravenously. Examples of a liquid to be administered are a saline solution, a glucose solution, a nutrient solution for parenteral feeding, an emulsion, or the like. The active ingredients can be provided in dissolved and/or dispersed form in the liquid.

BRIEF DESCRIPTION OF THE DRAWINGS

The subject matter of the invention is to be explained in greater detail hereafter with reference to an exemplary embodiment on the basis of FIG. 1 to FIG. 15 of the drawings.

FIG. 10 is a sectional view of the region of the sealing surface of the sealing strip shown in FIG. 9a.

The steps of an exemplary embodiment of the method according to the invention are to be explained with reference to the flowchart according to FIG. 15.

DETAILED DESCRIPTIONS OF THE DRAWINGS

Figure 1:
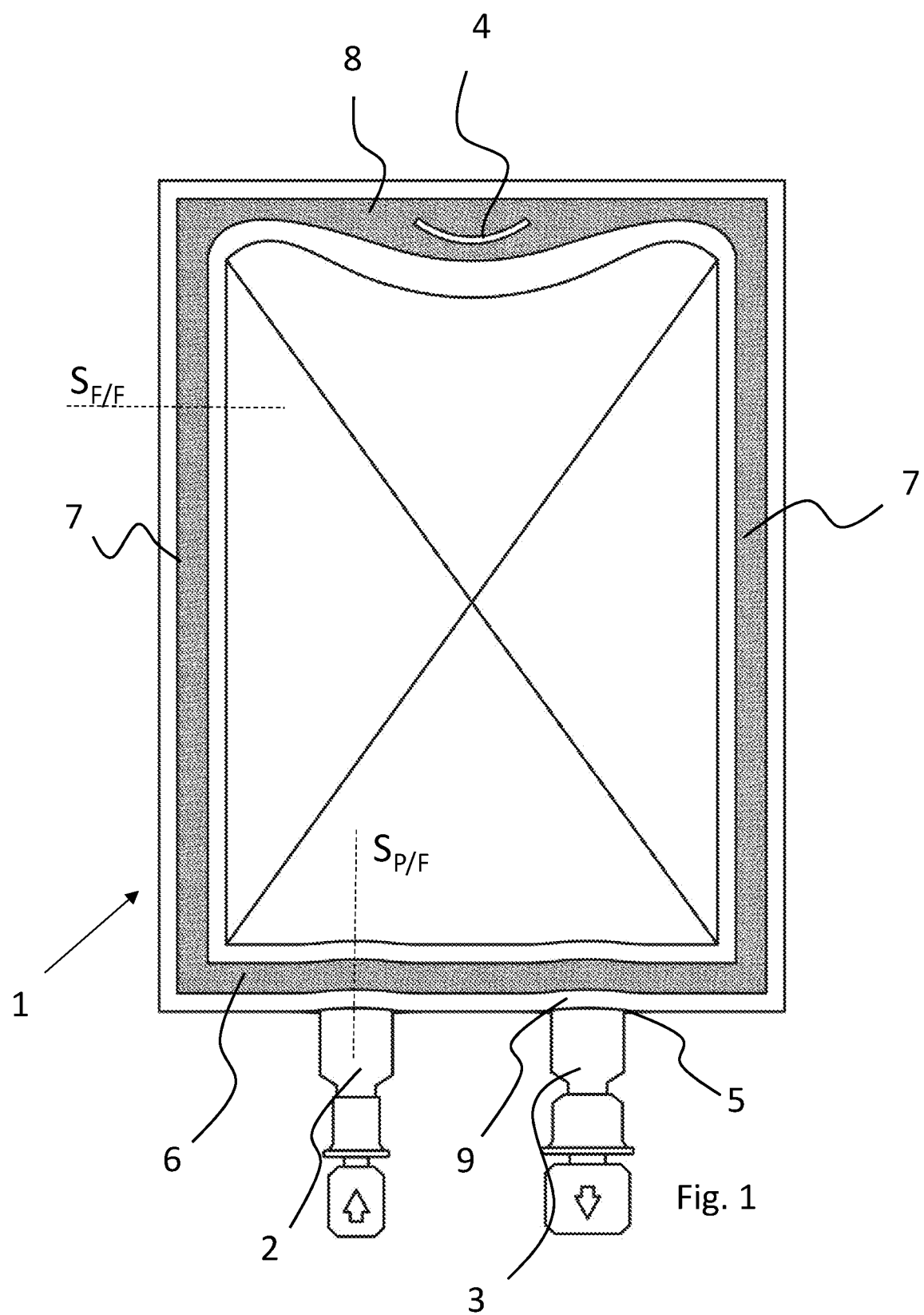
FIG. 1 is a schematic view of a medical pack according to the invention, which is formed as a bag.

FIG. 1 shows a medical pack formed as a bag 1, as can be produced according to the invention.

In this exemplary embodiment, the bag 1 comprises two ports 2, 3, in which one port 2 is provided for supplying and another port 3 is provided for removing liquid. The invention can also relate to bags 1 which comprise only one port 5 or a plurality of ports 5 (not shown here). For example, a bag 1 can have one to four ports 5. The bags 1 can be filled, for example, with a saline solution. Such bags 1 can in particular also be prefilled with a solution already containing an active ingredient.

The ports 2, 3 are welded in and each comprise one welded-in portion 5 for this purpose. The examples shown here each show the welded-in portion 5 in the embodiment of a ship-shaped welded-in portion 5 (see also FIGS. 4, 8, and 14 in this regard). The welded-in portions 5 can also be provided in the form of a tube section or hose section.

The ship-shaped welded-in portions 5 are also welded into the bag edge during the welding of the weld seam 6, which is also referred to as a transverse weld seam, and are therefore covered by the film 9 of which the bag 1 consists.

The bag 1 consists, for example, of a polyolefin film, in particular of a polyethylene or polypropylene film.

In addition to the transverse weld seam 6, the bag 1 is also closed by the peripheral weld seams 7, which are also referred to as longitudinal weld seams, and by the upper transverse weld seam 8. In the region of the upper transverse weld seam 8, the bag 1 also comprises a hanger 4.

The cross section of a weld seam 6, 7, 8, in which two films 9 are welded to one another directly (without welded-in port 5), is identified by $S_{F/F}$. In contrast, the cross section of a weld seam 6 in which a port 5 is also welded into the film edge is identified by $S_{P/F}$. It will be explained with reference to the following drawings how the weld seams 6, 7, 8 are formed.

Figure 2:
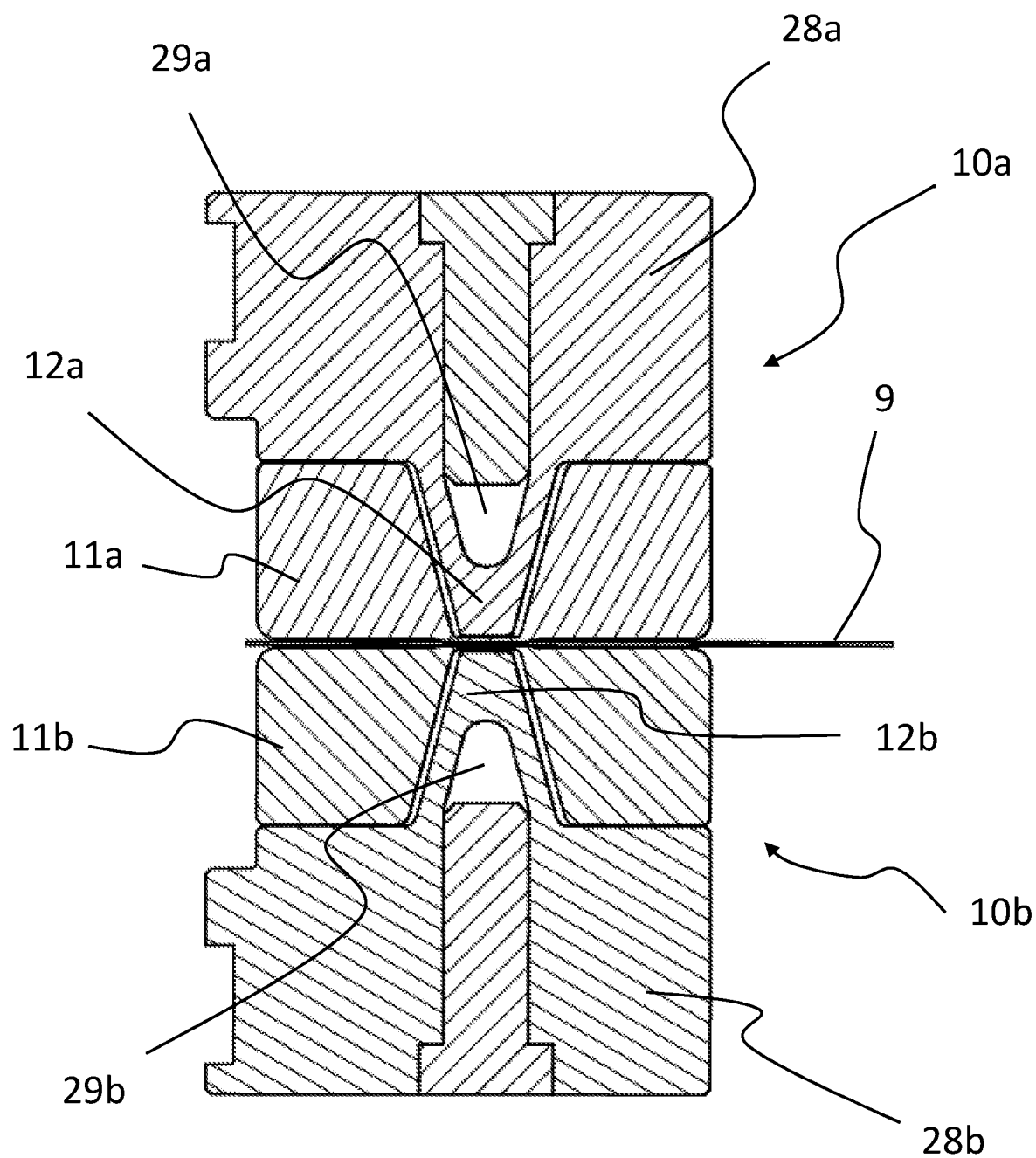
FIG. 2 is a sectional view of the welding tool.

FIG. 2 shows a schematic sectional view of parts of the welding tool, by means of which the films 9 and the port 5 are welded. In addition to the welding jaws 10a and 10b, the welding tool also comprises the mechanism (not shown here) for moving the welding jaws 10a, 10b, a coolant supply, and a control electronics unit, inter alia, for activating the heating conductor 13.

To weld two films to one another, for example, the welding jaws 10a and 10b are pressed onto the films 9 to form a weld seam 6. Each welding jaw 10a, 10b comprises a cooling element 12a and 12b and an upper part 11a, 11b. The cooling elements 12a and 12b protrude into the respective upper part 11a and 11b. Said upper parts 11a and 11b each comprise a sealing surface 17 and are pressed onto the films 9. The two upper parts 11a and 11b, in particular the sealing surface 17 and/or the clamping regions thereof, are preferably metallic and hard. They do not provide a flexible counter bearing. The two upper parts 11a, 11b are preferably constructed substantially symmetrically, in particular the sealing surfaces 17 and clamping region thereof.

The lower part 28a, 28b of the respective welding jaw 10a, 10b respectively comprises a cooling channel 29a, 29b, which extends along the cooling element 12a, 12b and via which the cooling element 12a, 12b is continuously cooled by conducting through coolant liquid. The upper part 11a/11b is seated on the lower part 28a/28b and is cooled by the lower part 28a/28b.

Figure 3:
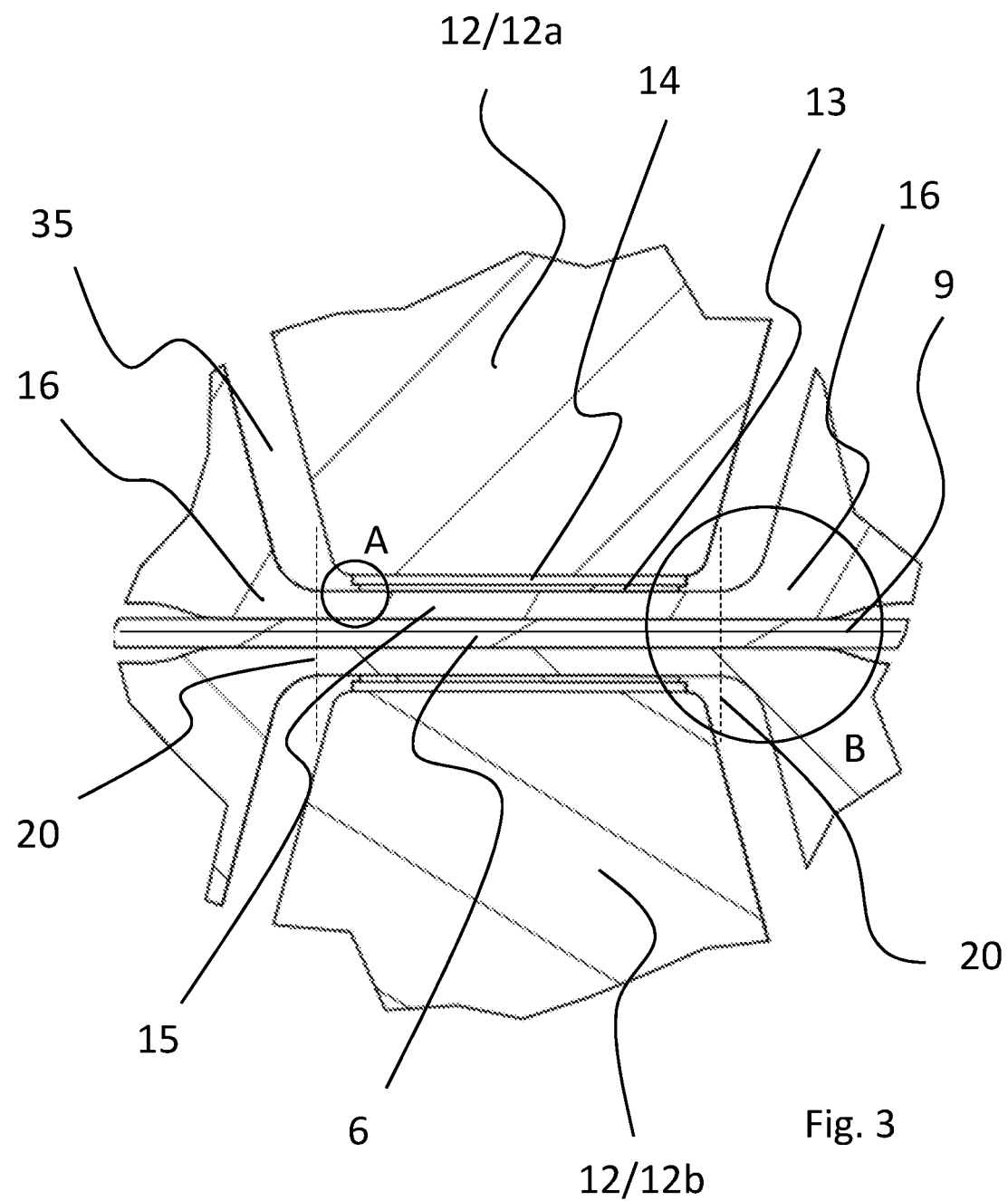
FIG. 3 is a detail view of FIG. 2.

FIG. 3 is a detail view of FIG. 2, in which it can be seen that a heating conductor 13 is arranged on each of the cooling elements 12a, 12b. A membrane 15 is heated via the heating conductor 13 to plasticize the plastic material of the films 9.

The welding procedure is carried out in pulsed operation. In this case, the cooling element 12a, 12b is continuously cooled using a liquid and the heating conductor 13 is heated in a chronologically limited manner in pulses.

If electric current flows through the heating conductor 13, the membrane 15, which rests on the films 9, thus heats up to a temperature of preferably 180° C. to 350° C. and plasticizes the films 9 in the region of the weld seam 6. The films 9 are plasticized or softened in such a way that the films 9 bond to one another and/or the films 9 bond to the port 5 to form the weld seams 6, 7 and 8. The surface of the port 5 can possibly also soften somewhat.

The boundaries 20 of the weld seam 6 illustrated here are indicated by the dashed lines. The weld seam 6 is wider than the heating conductor 13. The heating conductor 13 is preferably between 10 and 30%, particularly preferably between 15 and 25%, narrower than the weld seam 6. The heating conductor 13 is preferably between 3 and 6 mm wide. The clamping region 16 extends peripherally in relation to the boundary 20 of the weld seam 6. The surface of the welding jaw 10, 10a/10b is set back peripherally in relation to the clamping region 16, since the sealing surface 17 and the clamping regions 16 are formed as a sealing strip 32 protruding out of the surface of the welding jaw (see also FIG. 9 and FIG. 9a in this regard).

The membrane 15 is preferably formed in one piece with the remaining upper part 11, 11a, 11b. The region of the membrane 15 comprises the sealing surface 17 of the respective welding jaw 10, 10a, 10b, 10c. The membrane 15 preferably has a thickness of only 300-600 μm and is peripherally delimited by a solid block, which together form the respective upper part 11a, 11b. Due to its low thickness, the membrane 15 can heat up rapidly upon switching on of the heating conductor 13 and after the heating conductor 13 is switched off, can cool down again rapidly because of the permanent cooling. This enables a dynamic method. In particular, the adjoining clamping region 16 thus cannot substantially heat up (see also hereafter in the text in this regard).

The membrane 15 is tensioned upon heating and bulges slightly forward, i.e., in the direction of the film 9, because of the thermal expansion. A greater force per unit of area and thus an additional pressure is exerted on the weld seam 6 in this way. The plasticized material is thus compressed, which improves the formfitting connection. This additionally has the result that possible shape and/or dimensional tolerances can be compensated for by material flowing into these regions because of the additional pressure.

Because of the cooling, the clamping region 16 of the respective welding jaw 10a, 10b adjoining the boundary 20 of the weld seam 6 is sufficiently cold that the material is not plasticized in this region.

The welding jaws 10a, 10b thus rest on the films 9 and, because they rest thereon, are held spaced apart using the adjoining clamping region 16, in which the plastic material does not liquefy and therefore cannot be displaced, in such a way that the plasticized material is not pressed out in the region of the weld seam 6. A closed cavity is thus formed inside the weld seam 6 during a welding procedure.

An insulating layer 14 is arranged between a heating conductor 13 and a cooling element 12a, 12b. The heating conductors 13 are placed, for example, with an insulating layer 14, in particular a silicone layer, on the cooling elements 12a, 12b.

On the opposing side, the heating conductor 13 is applied directly to the membrane 15 to ensure rapid heating of the membrane 15. At the same time, the membrane 15 can only bulge forward, i.e., in the direction of the film 9, upon heating as a result of the applied heating conductor 13. The heating conductor 13 and/or the membrane 15 are provided with a thin insulating layer (not shown). This prevents the membrane 15 applied to the heating conductor 13 from short-circuiting the heating conductor 13. For this purpose, the side of the membrane 15 applied to the heating conductor 13 can be provided, for example, with an insulating oxide layer or a layer or film of polyimides (not shown).

The side walls of the cooling element 12, 12a, 12b are each spaced apart by a gap 35 from the opposing side wall of a recess of the upper part 11a, 11b.

Figure 3A:
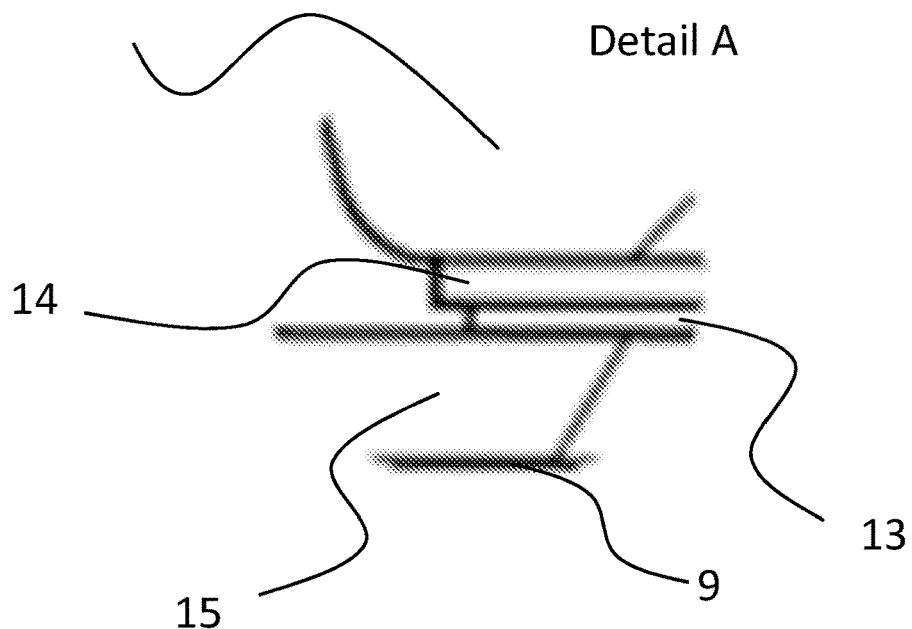
FIG. 3a and FIG. 3b are detail views of FIG. 3, in which the configuration of the heating conductor and the boundary of the clamping region are shown.

FIG. 3a is a detail view of the region A of FIG. 3. The heating conductor 13 ends in this region. The heating conductor 13 is placed on the cooling element 12/12a here by means of an insulating layer 14, for example, a silicone layer. The insulating layer 14 preferably produces an integrally-joined bond of the heating conductor 13 to the cooling element 12/12a. The insulating layer 14 acts as a thermal insulating layer. It can also act as an electric insulating layer, so that in particular further electrical insulation of the cooling element 12/12a can be omitted.

The cooling element 12/12a is also continuously cooled during the welding method. In particular because of the insulating layer 14, the heating conductor 13 operated in pulsed operation heats up sufficiently strongly during a welding cycle that the membrane 15 is heated in the boundaries 20 of the weld seam 6 in such a way that the plastic material of the adjoining film 9 plasticizes.

Figure 3B:
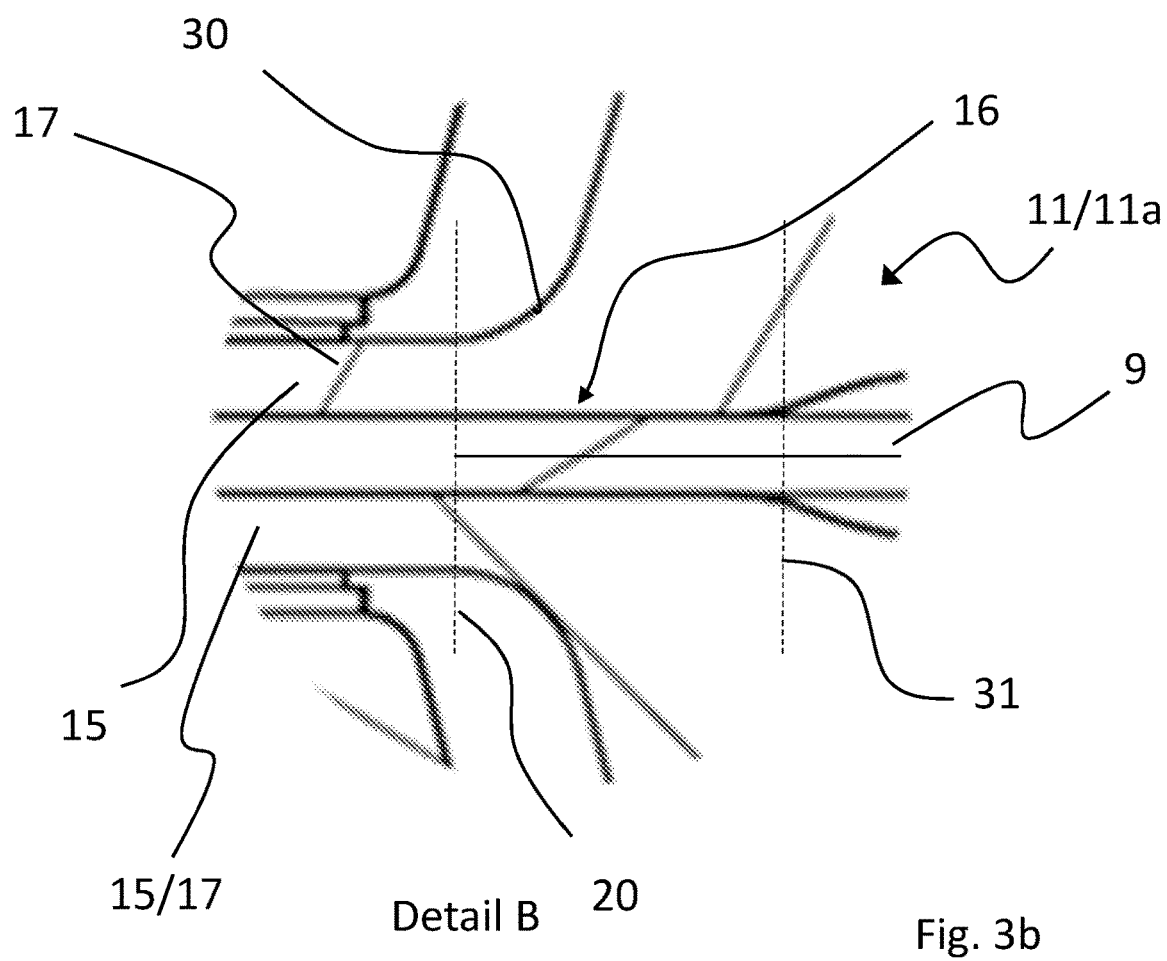

FIG. 3b is a detail view of the region B of FIG. 3. In the region in which the membrane 15 heats up in such a way that the plastic material is plasticized, the membrane 15 forms the sealing surface 17. The sealing surface 17 extends up to the boundary 20 of the weld seam 6. The membrane 15 ends in a transition region 30, which is rounded here, and merges into the upper part 11a/11b formed as a block 21. The clamping region 16 adjoining the boundary 20 of the weld seam 6 begins approximately with the transition region 30 in this exemplary embodiment.

The outer boundary 31 of the clamping region 16 is identified by a line. The sealing strip 32, which is formed from the sealing surface 17 and the clamping region 16, protrudes out of the upper part 11a/11b in this region.

Figure 4:
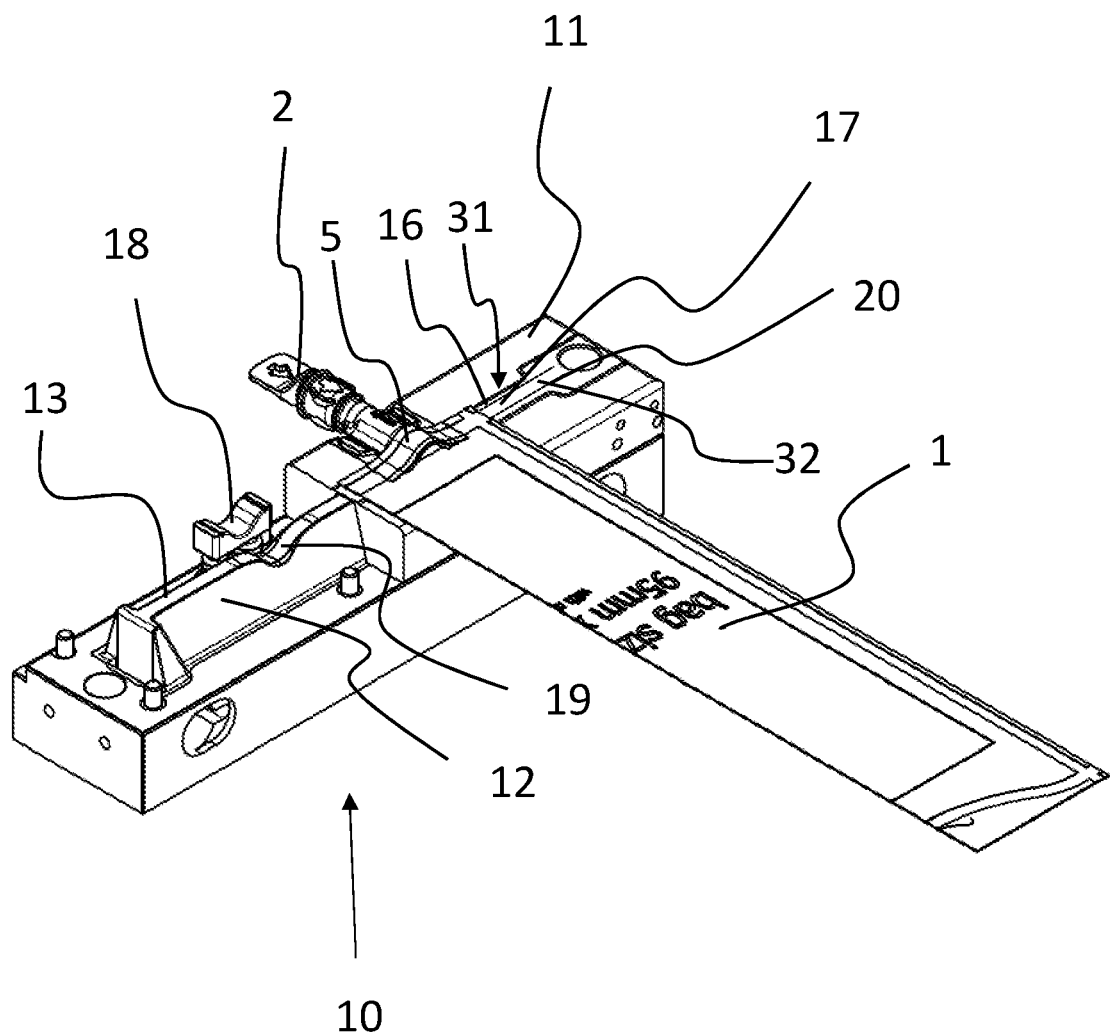
FIG. 4 is a perspective view of a welding jaw having applied bag and partially removed upper part.

FIG. 4 is a partially cutaway three-dimensional view of a welding jaw 10, on which a bag 1 is laid. The bag 1 or the films 9 having the weld seam 6 to be formed are clamped by a welding tool for welding, in accordance with the illustration according to FIG. 2. The second welding jaw 10 of the welding tool is not shown here. The second welding jaw can be embodied precisely like the welding jaw 10 visible here.

The upper part 11 of the welding jaw 10 and the bag 1 are blanked out on the half shown on the left. The cooling element 12 protrudes into the upper part 11 and carries the heating conductor 13. The cooling element 12 is cooled here using a liquid, in particular using water.

The welding jaw 10 shown here is designed to also weld in the port 2, 3 in a welding procedure. For this purpose, the welding jaw 10 comprises at least one recess 19, which is used to accommodate the ship-shaped welded-in portion 5 of the port 2, 3. Furthermore, at least one holder 18 is provided for securing the upper part of a port 2, 3. The heating conductor 13 also follows the contour of the ship-shaped welded-in portion 5 in the region of the recess 19 for the ship-shaped welded-in portion 5.

The upper part 11 of the welding jaw 10 comprises the sealing strip 32. The sealing strip 32 provides the sealing surface 17 and the clamping region 16. For this purpose, the sealing strip 32 protrudes out of the upper part 11. It represents a type of step in the upper side of the upper part 11. The lateral boundaries of the sealing strip 32 are defined by the boundaries 31 of the clamping region 16 (see also FIG. 3b in this regard).

The sealing surface 17 heatable by the heating conductor 13 is provided in particular by the membrane 15.

During a welding procedure, the sealing surface 17 heats up, whereby the plastic material of the films 9 is plasticized.

For a welding procedure, the heating conductor 13 is heated for several seconds, preferably for fewer than 3 seconds. In this case, the current I (see also FIG. 5) flows through the heating conductor 13 formed as a metal strip, whereby the heating conductor 13 heats up, in spite of the continuous cooling via the cooling element 12/12a/12b.

The heating is then switched off and the material cools down rapidly, in particular because of the cooling element 12. The cooling time until opening the welding jaws 10a, 10b is preferably less than 3 seconds.

The clamping region 16 of the welding jaw 10 adjoining the sealing surface 17 is used as a support on the film 9 of the bag 1 during the welding procedure and is permanently cooled.

Figure 5:
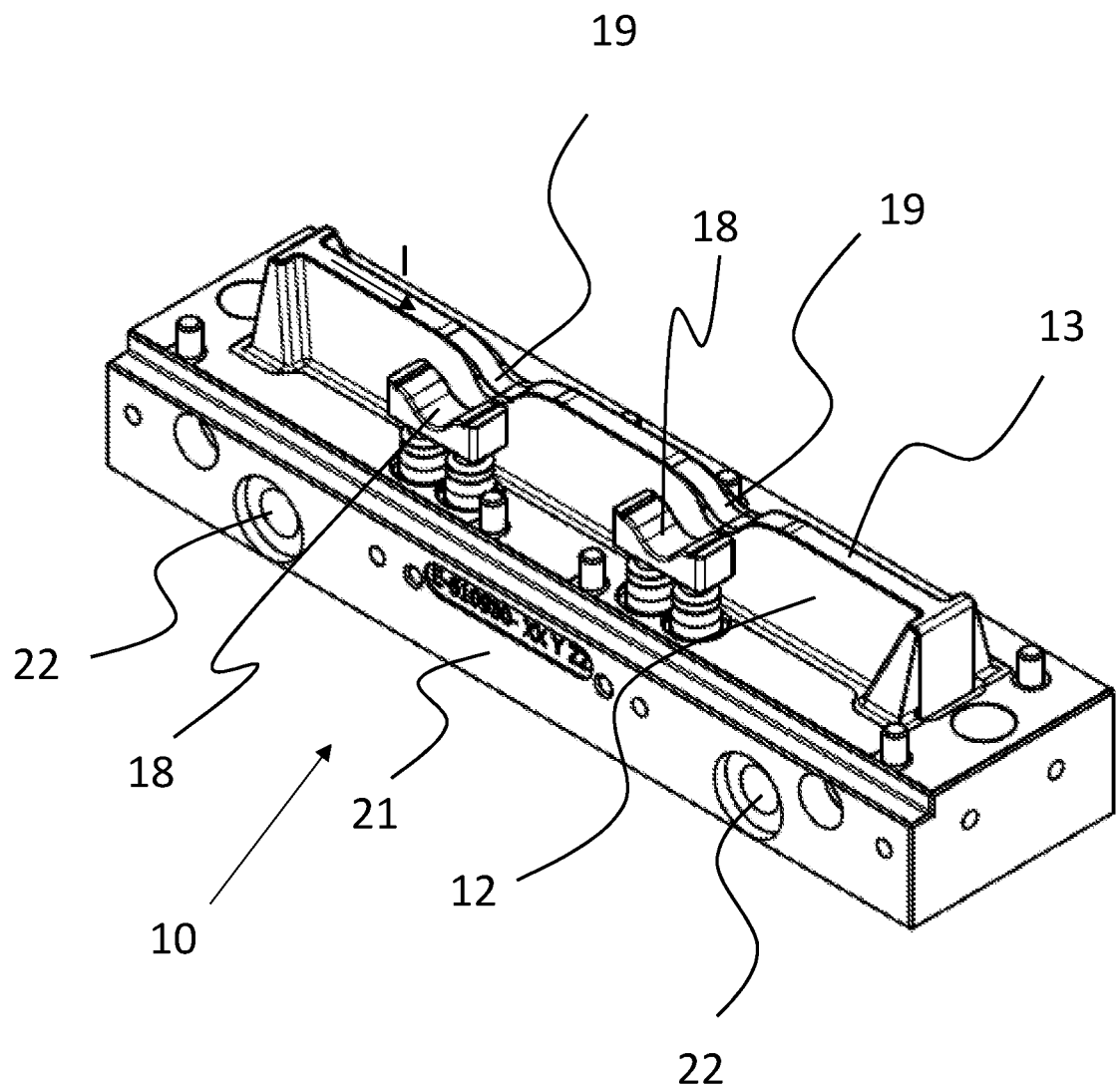
FIG. 5 is a perspective detail view of a welding jaw having completely removed upper part.

FIG. 5 is a perspective view of the welding jaw 10 with completely removed upper part 11.

The cooling element 12 comprises a main element or block 21 having the coolant fittings 22, out of which the upper part of the cooling element 12, which carries the heating conductor 13, protrudes. The recesses 19 are each used to accommodate one ship-shaped welded-in portion 5 of a port 2, 3. The upper parts of a port 2, 3 are supported by the holders 18.

The cooling element 12 preferably consists of a material having good thermal conductivity, in particular of aluminum or copper or an aluminum or copper alloy.

The heating conductor 13 can be a copper strip. However, the heating conductor 13 can also be, for example, a metal strip of an iron-nickel alloy, preferably having a coefficient of thermal longitudinal expansion $\alpha$ less than $5*10^{-6}$/K, particularly preferably less than $2*10^{-6}$/K (at 20° C. to 300° C.)

Figure 6:
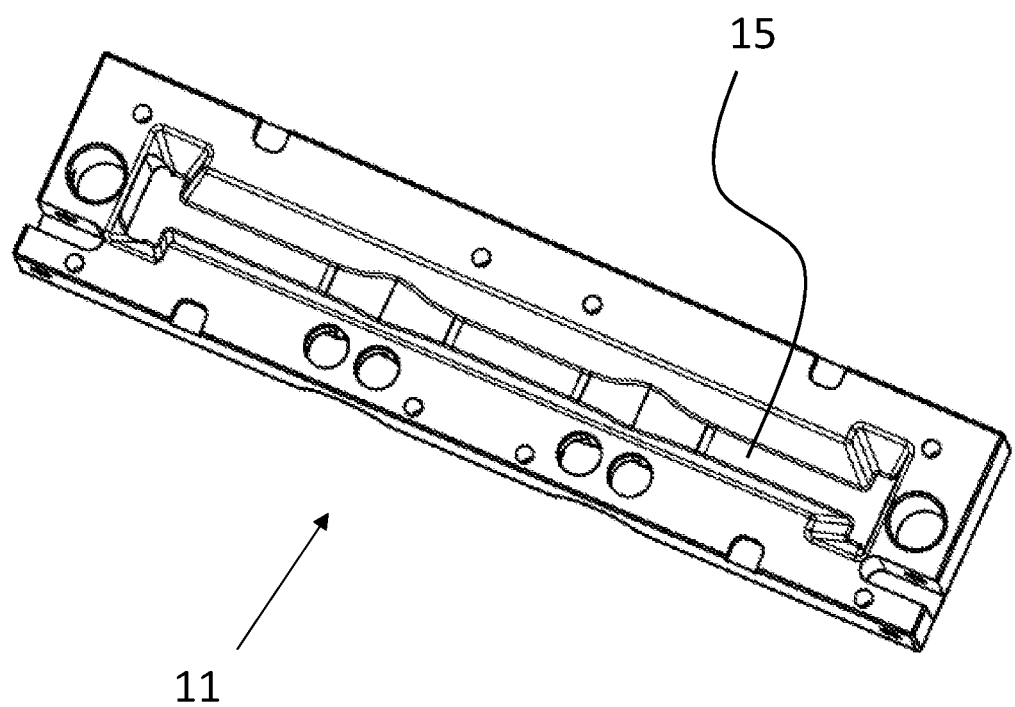
FIG. 6 is a perspective internal view of the upper part of a welding jaw.

FIG. 6 is a perspective internal view of the upper part 11 of a welding jaw 10. In particular the membrane 15, the opposing side of which forms the sealing surface 17, can be seen in this illustration. The upper part 11 has a trench, into which the cooling element 12 protrudes (see also FIG. 5 in this regard). The upper part 11 is formed here as a solid block, in which the membrane 15 is tensioned. The upper part 11 and the membrane 15 are preferably embodied in one piece.

The upper part 11 preferably consists of a metal having low thermal expansion, in particular of an iron-nickel alloy. The coefficient of thermal longitudinal expansion $\alpha$ of the material is less than $5*10^{-6}$/K, particularly preferably less than $2*10^{-6}$/K at 20° C. to 300° C. in one preferred embodiment of the invention.

Figure 7:
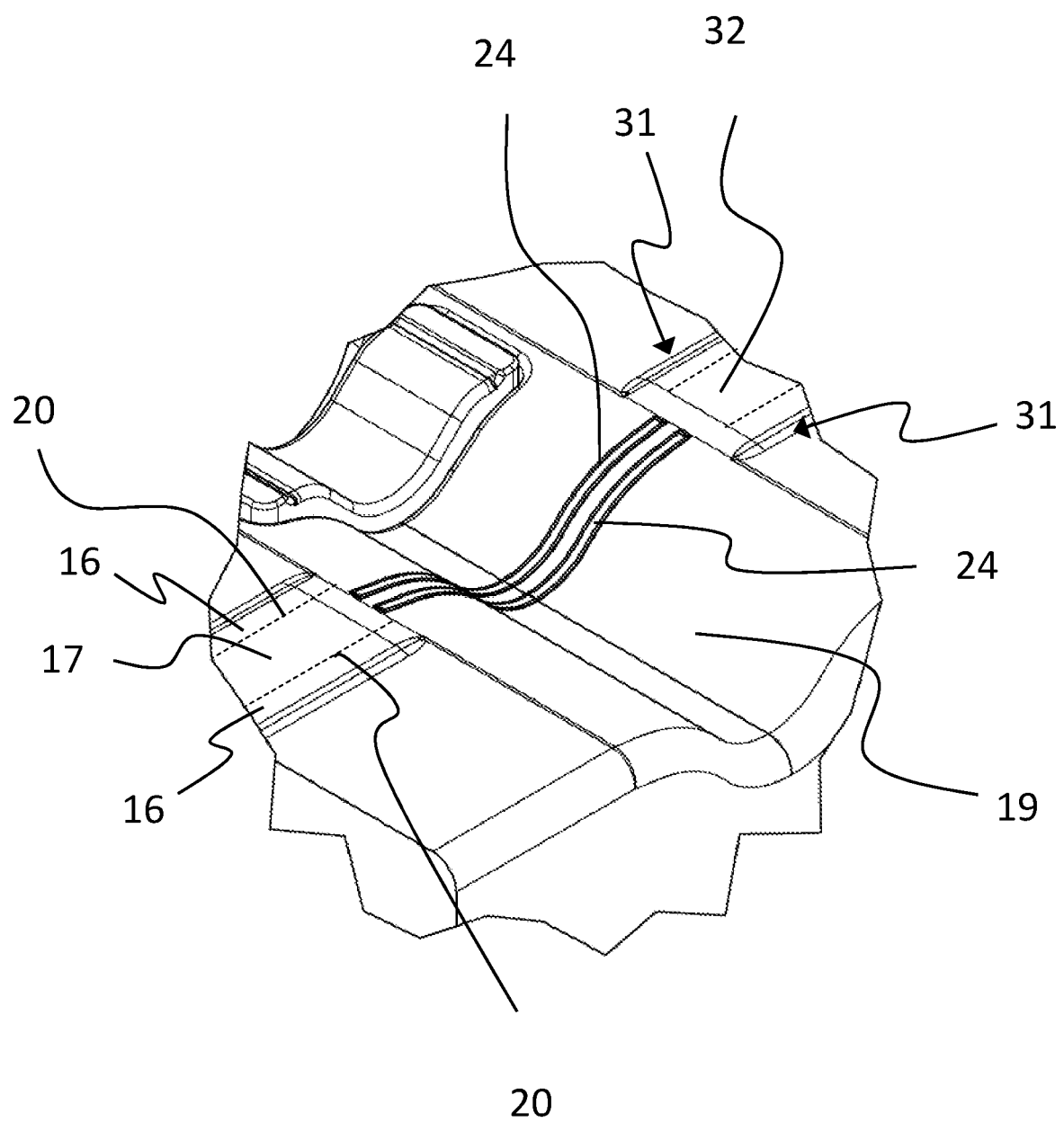
FIG. 7 is a perspective detail view of the region of a recess for the ship-shaped welded-in portion of a port in a welding jaw.

FIG. 7 is a perspective detail view of the region of the upper part 11a, 11b, in which a recess 19 is provided for the ship-shaped welded-in portion 5 of a port 2, 3. The recess 19 is formed as a trench-shaped depression extending transversely in relation to the sealing strip 32, through which the sealing surface 17 extends, to weld the film 9 to the ship-shaped welded-in portion of a port 2, 3.

The sealing strip 32 or the sealing surface 17 is also shown without plateau 23 here. Two ribs 24 spaced apart from one another protrude out of the sealing surface 17 into the recess 19. The ribs 24 end essentially in the region in which the recess 19 merges back into a plane, which the sealing surface 17 forms in the region in which two films 9 are welded to one another. The ribs 24 preferably have a width of 0.5 to 1.5 mm and/or a height of 10-60 µm.

The pressing of the film 9 onto the ship-shaped welded-in portion 5 can be improved by the ribs 24. Furthermore, material is displaced by the ribs 24, so that manufacturing tolerances of the ports 2, 3 or the film 9 can be compensated for.

The sealing surface 17, the boundaries 20 of the weld seam 9 to be produced, and the clamping region 16 and its boundaries 31 are only illustrated here in the plane of the sealing surface 32. The listed features are not shown in the recess 19 for reasons of illustration.

Figure 8:
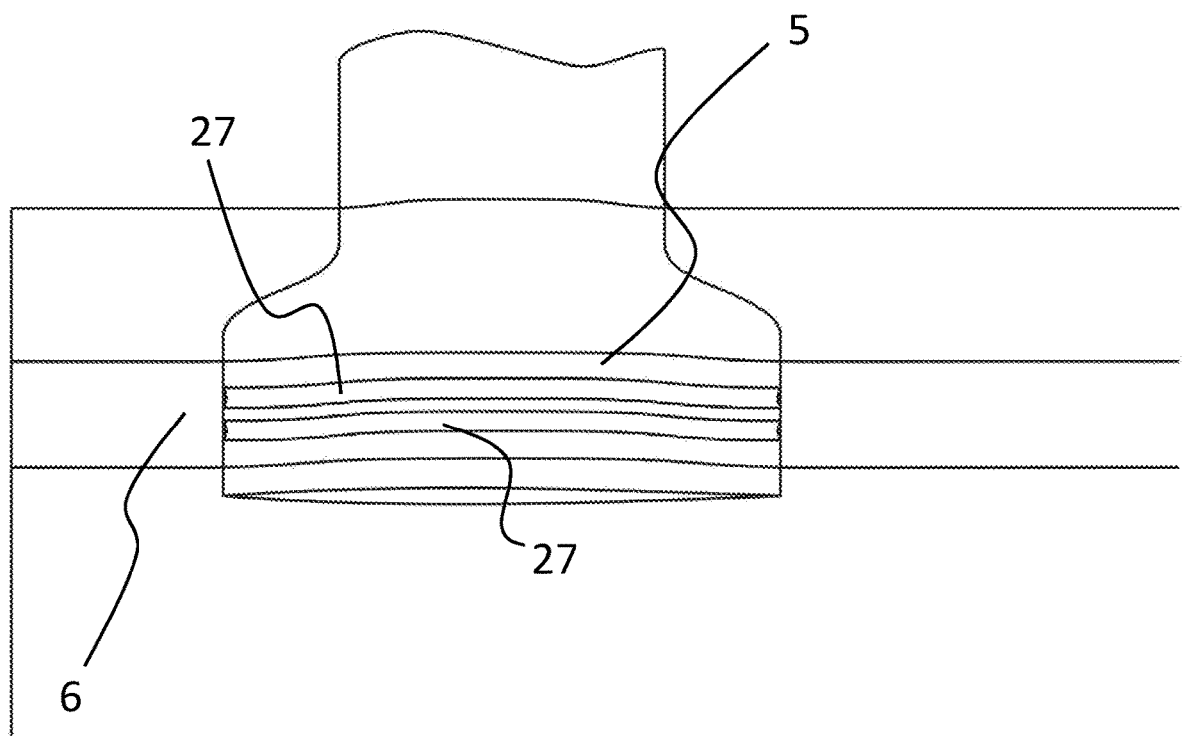
FIG. 8 is a perspective illustration of the port region of a bag, which was produced using the welding tool shown in FIG. 7.

FIG. 8 is a detail view of the bag 1 in the region of a port 2, 3, of which the ship-shaped welded-in portion 5 is shown here. In this embodiment of a bag 1, the port 2, 3 was welded in using the tool illustrated above in FIG. 7. The weld seam 6 is illustrated, which extends both over the region in which two films 9 are located one on top of another and also over the ship-shaped welded-in portion 5.

Two imprints 27 are provided in the region of the ship-shaped welded-in portion 5. These essentially correspond to the ribs 24 of the sealing strip 32 and/or the sealing surface 17. The two imprints 27 extend essentially parallel to the weld seam 6 here and end in the region of the two ends of the ship-shaped welded-in portion 5, which taper to a point. The region of the weld seam 6 adjoining thereon only consists of the films 9 welded on one another.

Figure 9:
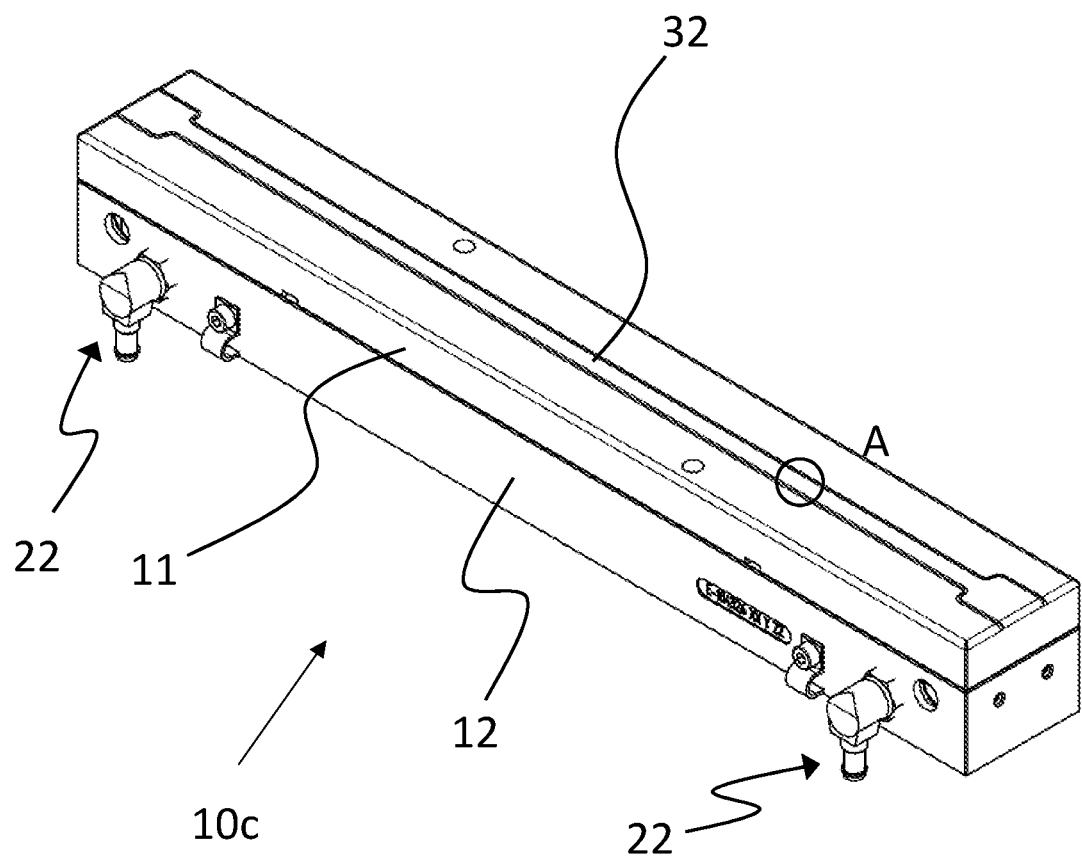
FIG. 9 shows an alternative embodiment of a welding jaw which is used for the weld seams, in which two films are bonded directly to one another (without ship-shaped welded-in portion of a port).

FIG. 9 shows a perspective view of a further embodiment of a welding jaw 10c, which does not have recesses 19 for accommodating a ship-shaped welded-in portion 5 of a port 2, 3.

The welding jaw 10c shown here thus comprises a sealing strip 32 without recesses 19 and is used in particular to form the weld seams 7 and 8 shown in FIG. 1. The fundamental structure of this welding jaw 10c essentially corresponds to the structure of the above-described welding jaws 10, 10a, and 10b. The sealing strip 32 protrudes out of the upper part 11 of the welding jaw, which is formed here in particular as a block.

Figure 9A:
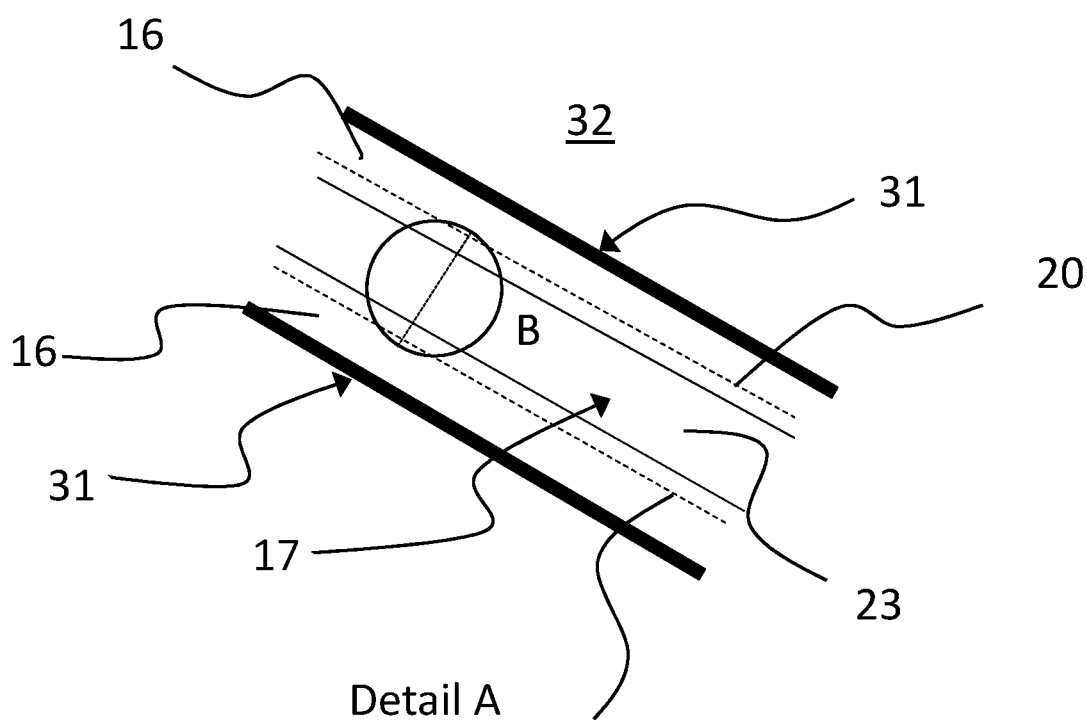
FIG. 9a is a detail view of the sealing strip of the welding jaw shown in FIG. 9.

FIG. 9a is a detail view of the region A of FIG. 9, which shows the sealing strip 32.

The sealing strip 32 is delimited by the boundaries 31 of the clamping regions 16. The boundaries 20 of the weld seam 6 define the extension of the sealing surface 17 (see also FIGS. 3, 3a, and 3b in this regard).

A plateau 23, the configuration and function of which will be described hereafter, also additionally extends above the sealing strip 32 inside the sealing surface 17 illustrated here.

Figure 10:
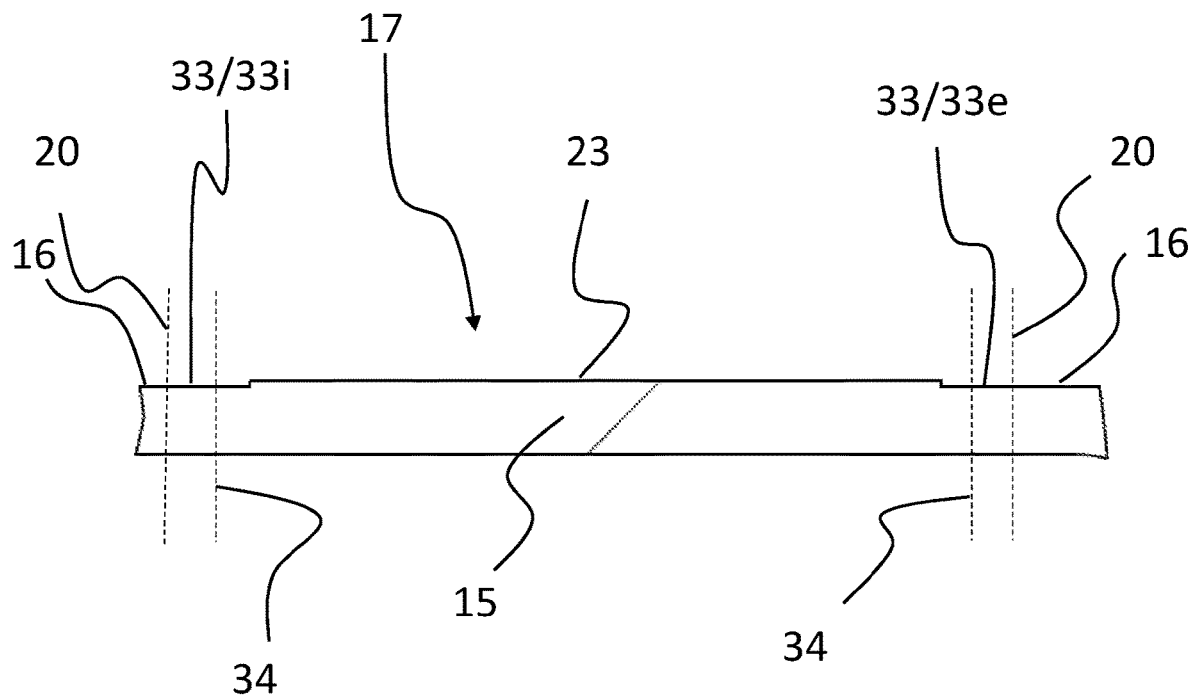

FIG. 10 is a sectional view along the dashed line shown in FIG. 9a in the region B of the sealing strip 32. The section is executed in a plane perpendicular to the main extension direction of the sealing strip 32.

The cross section of an upper side section of the sealing strip 32 and/or the membrane 15 over which the sealing surface 17 extends is shown. The two outer boundaries 31 of the clamping regions 16 are not shown here.

In this exemplary embodiment, the sealing surface 17 and/or the membrane 15 in the region of the sealing surface 17 is not formed completely level over the entire width, but rather additionally comprises the plateau 23.

The boundaries 20 of the weld seam 6, by which the edge of the sealing surface 17 is also defined, extend so that the plateau 23 is located inside the weld seam 6. Adjoining the plateau 23, the sealing surface 17 also comprises the regions 33i and 33e.

The mentioned region 33i is the peripheral inner region of the sealing surface 17. This is the region 33i of the sealing surface 17 which produces or provides the inner region 25i of the weld seam 6, 7, 8. This is the region 25i of the weld seam 6, 7, 8 which adjoins the interior of the bag 1.

The region 33e, in contrast, is the peripheral outer region of the sealing surface 17. This is the region 33e of the sealing surface 17 which provides the outer (external) region 25e of the weld seam 6, 7, 8. This is the region 25e of the weld seam 3, 7, 8 which adjoins the exterior of the bag 1.

The peripheral inner region 33i of the sealing surface 17 and the peripheral outer region 33e of the sealing surface 17 are at a height or essentially at a height with the respective adjoining clamping region 16.

The plateau 23 is embodied in particular as a plate-shaped plane in this exemplary embodiment.

The plateau 23 extends like a web or a strip, preferably substantially centrally, along the main extension direction of the sealing surface 17.

The plateau 23 protrudes beyond the adjoining clamping region 16 of the sealing strip 32. It is embodied as a type of step in the upper side of the sealing strip 32, the sealing surface 17, and/or the membrane 15.

An additional pressure is thus exerted on the film 9 in the region of the plateau 23 during the welding procedure. The pressure per unit of area is thus greater because of the plateau 23 in this region of the sealing surface 17 than in the adjoining outer region 33 of the sealing surface 17.

The plateau 32 is narrower than the total width of the sealing surface 17. The plateau is preferably also narrower than the heating conductor 13, in particular narrower by 0.2 to 0.8 mm. The boundaries 34 of the heating conductor 13 (not shown here) are marked by a dashed line. The heating conductor 13 itself is narrower than the weld seam 6, since the membrane 15 also heats up laterally adjoining the heating conductor 13 sufficiently strongly that the material of the film 9 is plasticized up to the boundary 20 of the weld seam 6.

The sealing strip 32 delimited by the outer boundary 31 of the clamping regions 16 is preferably between 5 and 15 mm, particularly preferably between 6 and 12 mm wide.

On the one hand, the film 9 is pressed on more strongly in the region of the weld seam 7 by the plateau 23. On the other hand, the melted, molten plastic material can flow into possible cavities, which can be present because of shape and/or dimensional tolerances, since it is displaced as a result of the higher pressure (see also FIG. 12 in this regard).

In one preferred embodiment, the plateau 23 has a height of less than 100 µm, preferably less than 60 µm. The risk thus does not exist that larger quantities of molten plastic will be pressed into the adjoining clamping region 16. The adjoining cooled clamping region 16 is closed in any case because of the applied film 9.

Because the membrane 15 as a whole is very thin, it is elastic and can in turn again yield to a pressure in the volume, which is formed by the molten plastic.

Figure 11:
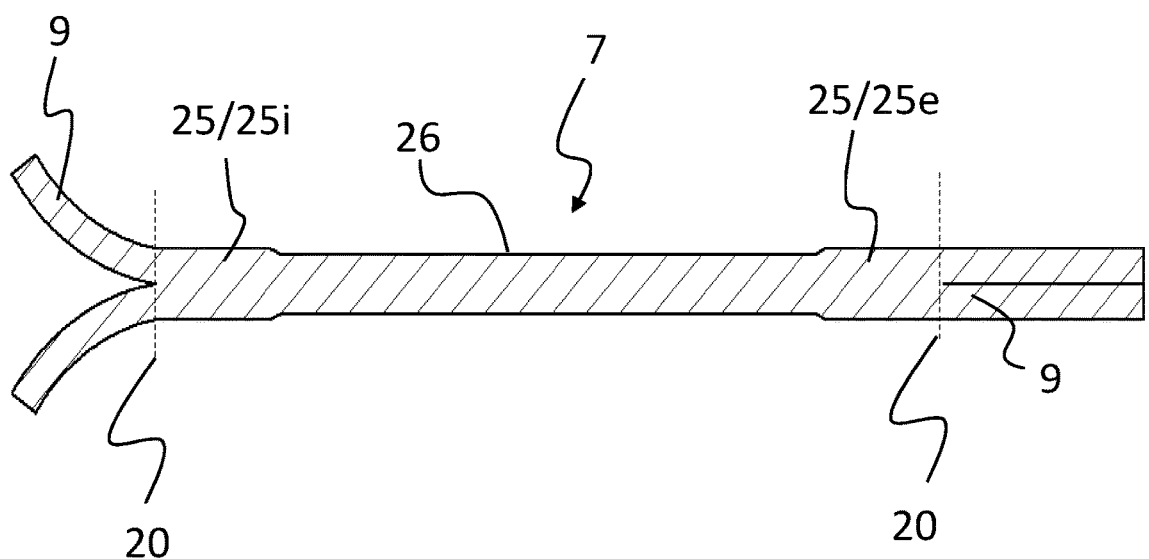
FIG. 11 is a schematic sectional view $S_{F/F}$ of the region of a weld seam (see FIG. 1 in this regard) which was produced using the welding tool shown in FIG. 9 and FIG. 10.

FIG. 11 shows the sectional view of a weld seam 7 of a bag 1, which was produced using the welding tool illustrated in FIGS. 9, 9a, and 10, in the region in which two films 9 are welded to one another (see the section $S_{F/F}$ in FIG. 1 in this regard). On the side shown on the left here, the weld seam 7 adjoins the enclosed interior of the bag 1. On the side shown on the right here, the weld seam 7 adjoins the external room or the surroundings of the bag 1. The two films 9 are not welded to one another on the left and right of the boundaries 20 of the weld seam 7.

The contour or the profile of the weld seam 7 is an imprint of the contour or the profile of the sealing surface 17 shown in FIG. 10.

A thinned-out region 26, on which non-thinned-out neighboring regions 25 adjoin, is provided in the middle part of the weld seam 7. The thinned-out region 26 represents the imprint of the plateau 23. The weld seam region 25i (shown on the left here) adjoining the interior of the bag 1 and the weld seam region 25e (shown on the right here) adjoining the (external) surroundings of the bag 1 have a greater thickness than the thinned-out region 25. The peripheral inner region 25i of the weld seam 7 in particular has a thickness which essentially corresponds to the total thickness of the two films 9. The greater thickness of the weld seam 7 in the region 25i adjoining the interior has proven to be extremely advantageous for the stability of the weld seam 9. The peripheral outer region 25e of the weld seam 7 can also have a thickness, as shown here, which essentially corresponds to the total thickness of the two films 9.

Figure 12:
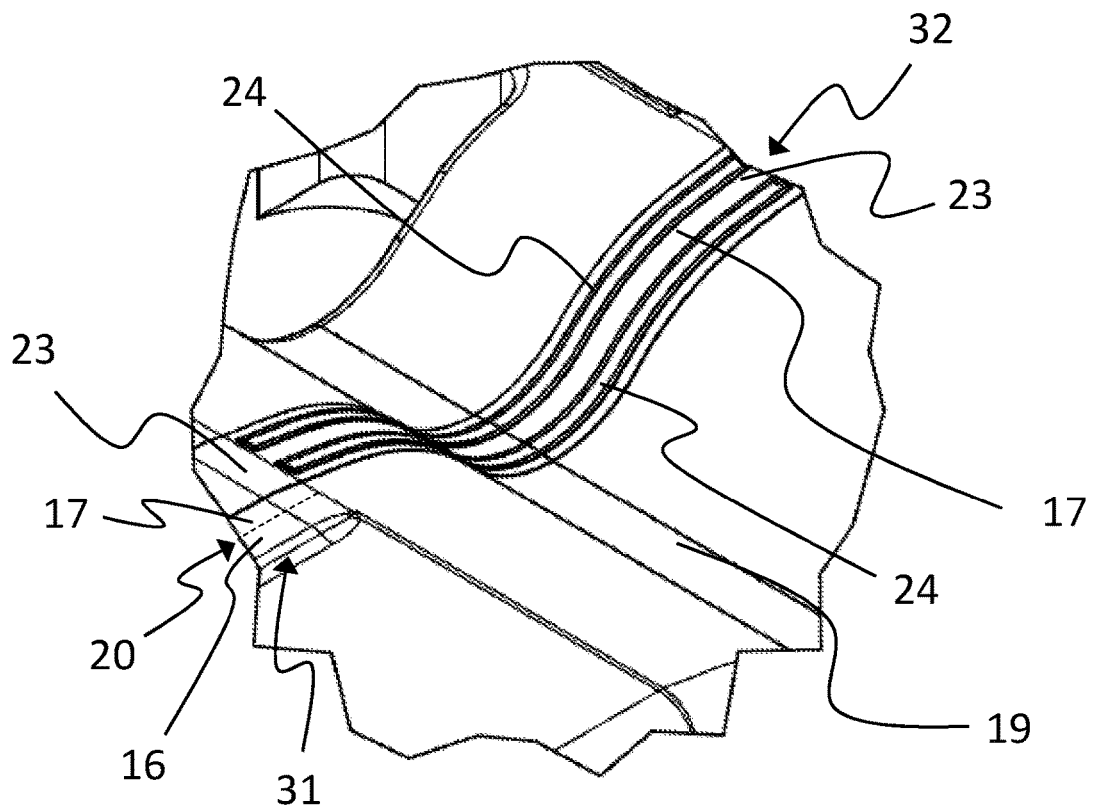
FIG. 12 is a detail view of the region of the recess for the ship-shaped welded-in portion of a port according to a further embodiment of the invention, in which the sealing surface has a plateau.

FIG. 12 shows a perspective view of a further exemplary embodiment, in which the region of the sealing surface 17 is shown in the region of the recess 19 for a ship-shaped welded-in portion 5 corresponding to the illustration according to FIG. 7. The sealing surface 17, its boundaries 20, and the clamping region 16 and its boundaries 31 are only partially illustrated here.

In this embodiment of the invention, the sealing surface 17 comprises the plateau 23, corresponding to the embodiment shown in FIG. 10, which extends over both the region of the recess 19 and also over the remaining level sealing surface 17 or sealing strip 32. In addition, two ribs 24 are applied to the plateau 23 (see also FIG. 7 in this regard).

Figure 13:
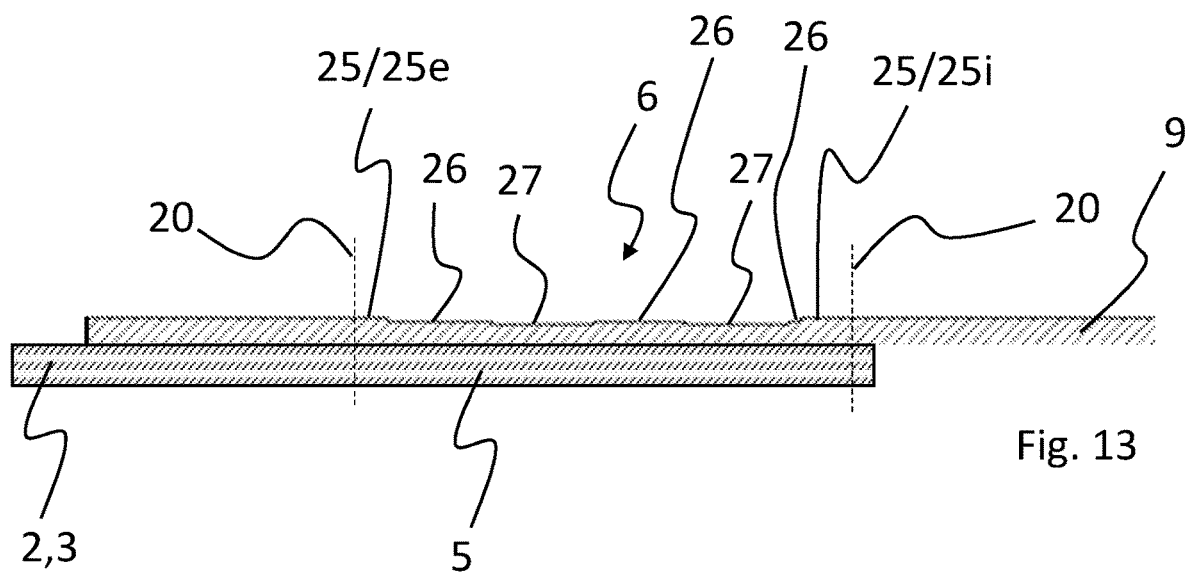
FIG. 13 is the section $S_{P/F}$ of a weld seam in the region of the ship-shaped welded-in portion of a port (see FIG. 1 in this regard), which was produced using the welding tool shown in FIG. 12.

FIG. 13 is a schematic sectional view of a film 9, which was processed in a welding method, in which the welding tool shown in FIG. 12 was used (see section $S_{P/F}$ in FIG. 1 in this regard). The weld seam 6 is shown in the region of the ship-shaped welded-in portion 5 (only schematically indicated). On the side shown on the right here, the weld seam 6 adjoins the enclosed interior of the bag 1. On the side shown on the left here, the weld seam 7 adjoins the external room or the surroundings of the bag 1.

The weld seam 6 has a thinned-out region 26, which is provided because of the imprint of the plateau 23, inside its boundaries 20.

The thinned-out region 26 is located centrally, preferably approximately in the middle, in the weld seam 6. A neighboring region 25 or 25i and 25e, in which the film 9 is essentially not thinned out, is provided in each case adjoining the thinned-out region 26. The film 9 is also welded or bonded to the port 2, 3 or its ship-shaped welded-in portion 5 in this region 25. In the region 25, however, the film 9 has essentially the same thickness as in the adjoining region, in which the film 9 is not welded to the ship-shaped welded-in portion 5. The greater thickness in the inner peripheral region 25i of the weld seam 6 has proven to be advantageous for the stability of the weld seam 6 as a whole in this case.

Furthermore, two imprints 27, which were introduced by the ribs 24, are also present inside the thinned-out region 26.

In contrast, the weld seam 6 corresponds to the illustration in FIG. 11 outside the region shown of the ship-shaped welded-in portion 5.

Figure 14:
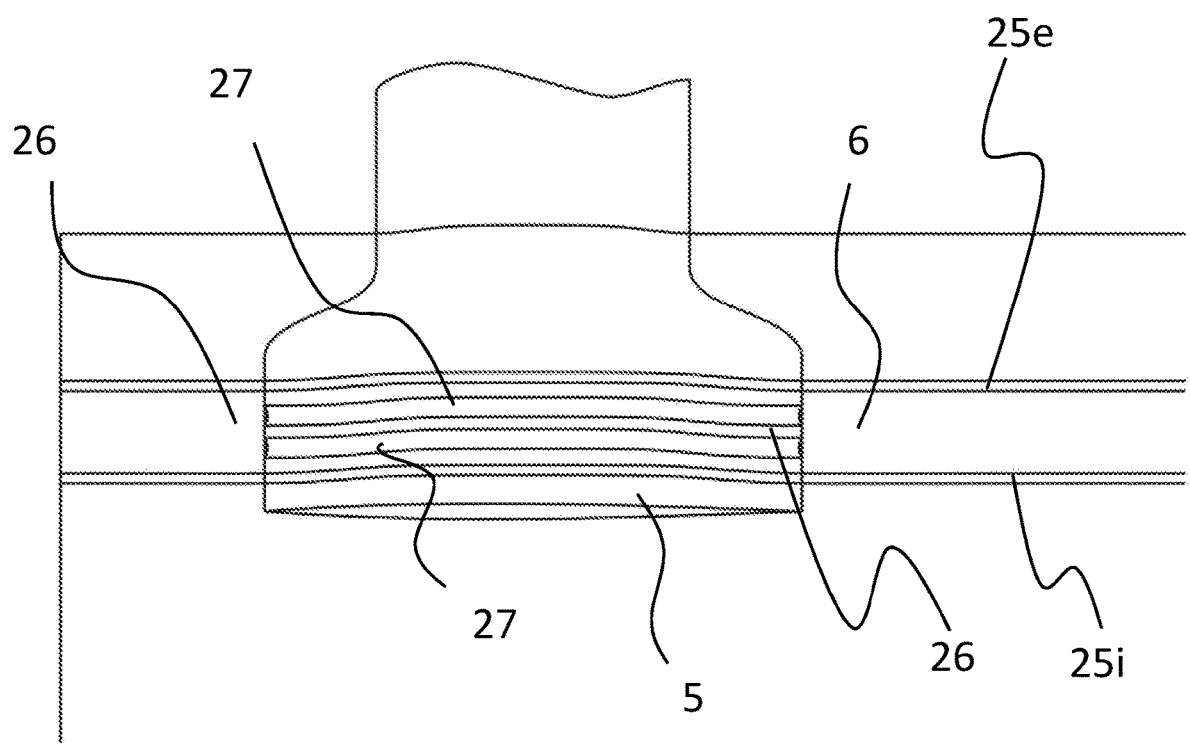
FIG. 14 is a detail view of the port region of a bag, which was produced using the welding tool shown in FIG. 12 and FIG. 13.

FIG. 14 is a detail view of the bag 1 in the region of a port 2, 3, of which the ship-shaped welded-in portion 5 is shown.

In this embodiment of a bag 1, the port 2, 3 was welded into the bag 1 using the tool shown above in FIG. 12. The weld seam 6 is illustrated here, which extends over the region in which two films 9 are bonded, and over the region in which the films 9 are bonded to the port 2, 3 or to its ship-shaped welded-in portion 5. The thinned-out region 26 and the two non-thinned-out peripheral inner regions 25i and outer regions 25e in the weld seam 6, which extend over the entire length of the weld seam 6, can be seen. This thinned-out region 26 in the weld seam 6 is the imprint of the above-described plateau 23. Moreover, two imprints 27 are provided in the region of the ship-shaped welded-in portion 5. These essentially correspond to the ribs 24 of the sealing strip 32 or the sealing surface 17 (see the description of FIG. 8 in this regard).

Figure 15:
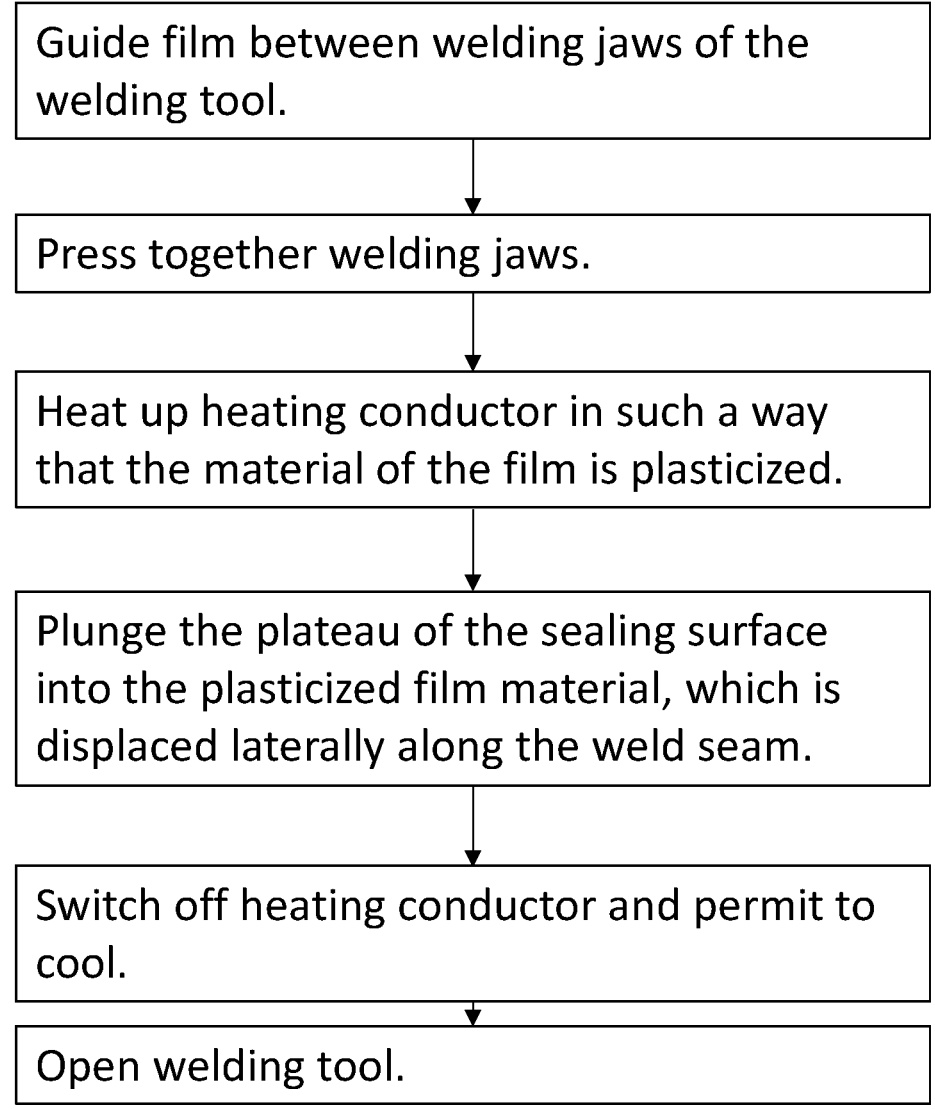

FIG. 15 is a flowchart of the method steps of an exemplary embodiment of a welding method according to the invention.

The welding method is executed as a noncontinuous pulse method, in particular having permanent cooling.

Firstly the film 9 is fed between the welding jaws 10, 10a, 10b, 10c of the welding tool.

The two welding jaws 10, 10a, 10b, 10c are then pressed together or closed. The closed state is firstly defined by the stop of the plateaus 23. The plateaus are used as a type of spacer. In this state, the clamping regions 16 of the upper and the lower welding jaw 10, 10a, 10b, 10c preferably do not yet come to the stop.

The respective heating conductor 13 is heated. The sealing surfaces 17 are heated by the heating conductor 13. The heating is in such a way that the films 9 are plasticized in the region of the sealing surfaces 17. The plateaus 23 can plunge into the now free-flowing film material. The welding jaws 10, 10a, 10b, 10c thus close completely. The clamping regions 16 now press against one another, separated by the films 9. The clamping regions 16 are cool or are cooled in such a way that the films 9 are not plasticized there. A closed space is thus formed.

Liquid film material is intentionally displaced by the plunging of the plateaus 23 into the plasticized films 9. The film material is in particular displaced at least laterally along the weld seam 6, 7, 8. The displaced film material can compensate for possible shape and/or dimensional tolerances in the films 9 and/or the ports 5 or fill them up. In the inner peripheral region 25i of the weld seam 6, 7, 8, in contrast, the film thickness is maintained.

The membrane 15 of the welding jaws 10, 10a, 10b, 10c can bulge and exert additional pressure on the weld seam 6, 7, 8. According to another embodiment of the invention, the heating conductor 13 can also already be heated before the welding jaws 10, 10a, 10b, 10c are pressed together.

The power supply to the heating conductor 13 is then switched off and the weld seam 6 cools down, inter alia, because of the preferably continuously running coolant supply, so that the welding tool can be opened when the material of the films 9 has sufficiently solidified again.

Considered as a whole, the method according to the invention can be compared to a combination of seam welding and injection molding. This is because a closed region, in which the material is molten during the welding procedure, is formed by the clamping of the film 9. It is possible to intentionally change the contour of the weld seam 9 in this case via an adaptation of the contour of the sealing surface 17 of the welding jaw in this region.

The susceptibility of a pulse welding method for welding plastic films to shape and dimensional tolerances, in particular to shape and dimensional tolerances of a port to be welded in, could be significantly reduced by the invention.

LIST OF REFERENCE SIGNS 1 bag
2 port
3 port
4 hanger
5 welded-in portion or ship-shaped welded-in portion
6 weld seam (transverse weld seam)
7 weld seam (longitudinal weld seam)
8 weld seam (transverse weld seam having hanger)
9 film
10, 10a, 10b, 10c welding jaw
11, 11a, 11b upper part
12, 12a, 12b cooling element
13 heating conductor
14 insulating layer
15 membrane
16 clamping region
17 sealing surface
18 holder
19 recess
20 boundary of the weld seam
21 block
22 coolant fitting
23 plateau
24 rib
25 neighboring region to the thinned-out region
25i peripheral inner region of the weld seam (adjoining the interior of the bag)
25e peripheral outer region of the weld seam (adjoining the external surroundings of the bag)
26 region in the weld seam which is reduced in thickness or thinned out
27 imprint of the rib in the weld seam
28a, 28b lower part
29a, 29b cooling channel
30 transition region (of the membrane)
31 boundary of the clamping region
32 sealing strip
33 outer region of the sealing surface
33i peripheral inner region of the sealing surface
33e peripheral outer region of the sealing surface
34 boundary of the heating conductor
35 gap between cooling element and upper part

The invention claimed is:

1. A welding tool for pulse welding a plastic film of a medical pack, said welding tool comprising a welding jaw having a sealing strip for clamping the film during welding thereof,
wherein the sealing strip extends along the welding jaw and can be pressed onto the film,
wherein the sealing strip comprises a sealing surface and inner and outer clamping regions that adjoin the sealing surface,
wherein the sealing strip can be heated to plasticize that portion of the plastic film that adjoins the sealing surface, thereby forming a weld seam, and
wherein the sealing surface comprises
a plateau that protrudes from the sealing strip
an inner peripheral region that extends between the plateau and the inner clamping region, and
an outer peripheral region that extends between the plateau and the outer clamping region,
wherein the inner and outer peripheral regions are depressed relative to the plateau,
wherein, during welding, the inner and outer peripheral regions form closed cavities that are disposed between the plateau and the clamping regions and that receive plasticized plastic material that has been displaced as a result of film above said plateau having been melted.

2. The welding tool of claim 1, wherein the plateau extends along a midline of the sealing surface.

3. The welding tool of claim 1, wherein, during welding, the inner clamping region at a temperature that is less than a plasticizing temperature of the film that is to be welded.

4. The welding tool of claim 1, wherein the inner and outer peripheral regions of the sealing surface are coplanar with their respective adjoining clamping regions.

5. The welding tool of claim 1, further comprising a cooling element on which an electrical heating conductor is placed, wherein an upper part the sealing strip, is placed on the cooling element.

6. The welding tool of claim 1, wherein the medical pack comprises a port having a welded-in portion and wherein an upper part of the welding tool comprises a recess that accommodates the welded-in portion of the port.

7. The welding tool of claim 1, wherein the medical pack comprises a port having a welded-in portion and wherein the sealing surface comprises two protruding ribs in a region of the welded-in portion of a port.

8. The welding tool of claim 1, wherein the medical pack comprises a port, wherein the welding tool comprises a recess that accommodates a portion of the port and a region that adjoins the recess, wherein, during welding, the recess that accommodates the portion of the port is heated to a higher temperature than the region that adjoins the recess.

9. The welding tool of claim 1, wherein the plateau extends along a strip on the sealing surface and wherein the closed cavities extend parallel to said strip.

10. The welding tool of claim 1, wherein the plateau is narrower than the weld seam and wherein the inner and outer peripheral regions are each narrower than the weld seam.

11. The welding tool of claim 1, wherein the plateau has a height that is between twenty and sixty micrometers above the inner and outer peripheral regions and wherein the closed cavities extend at least as high as the plateau.

12. The welding tool of claim 1, wherein the medical pack comprises a port that is to be within the weld seam after welding thereof, wherein the sealing surface comprises a region that accommodates the port, and wherein the region that accommodates the port comprises a protruding rib.

13. The welding tool of claim 1, further comprising a bulging membrane that comprises the sealing surface.

14. The welding tool of claim 1, wherein the film has a plasticizing temperature and wherein the welding tool further comprising a heating conductor that is narrower than the weld seam and that fails to extend to the outer clamping region, whereby during welding, the heating conductor fails to heat the inner and outer clamping regions all the way up to the plasticizing temperature, whereby the welding tool is unable to weld film that is at the inner and outer clamping regions.

15. The welding tool of claim 1, wherein the outer peripheral region of the sealing surface is coplanar with the outer clamping region.

16. The welding tool of claim 1, wherein the welding tool combines seam welding and injection molding, wherein injection molding is carried out as a result of material from a thinned-out region of said weld seam that is above said plateau flowing into said closed cavities to form non-thinned-out neighboring regions in said closed cavities, said neighboring regions in said closed cavities being thicker than the thinned-out region that is above said plateau.

17. The welding tool of claim 1, wherein the welding jaw comprises a recess that extends transverse to the sealing strip, the recess defining a trench that is crossed by the sealing strip and that is sized to accommodate a ship-shaped portion of a port of a medical pack to permit welding the film to the port.

18. A pulse welding method comprising using a welding tool for pulse welding a plastic film of a medical pack, wherein the welding tool comprises a welding jaw having a sealing strip for clamping the film during welding thereof, wherein the sealing strip extends along the welding jaw and can be pressed onto the film, wherein the sealing strip comprises a sealing surface and inner and outer clamping regions that adjoin the sealing surface, wherein the sealing strip can be heated to plasticize that portion of the plastic film that adjoins the sealing surface, thereby forming a weld seam, wherein the sealing surface comprises a plateau that protrudes from the sealing strip, an inner peripheral region that extends between the plateau and the inner clamping region, and an outer peripheral region that extends between the plateau and the outer clamping region, wherein the inner and outer peripheral regions are depressed relative to the plateau, wherein, during welding, the inner and outer peripheral regions form closed cavities that are disposed between the plateau and the clamping regions and that receive plasticized plastic material that has been displaced as a result of film above said plateau having been melted, said method comprising compensating for shape and dimensional tolerances, wherein compensating for the shape and dimensional tolerances comprises pressing the welding jaw of the welding tool to form a weld seam onto the film, clamping the film peripherally to form the closed cavities, maintaining the clamping region at a temperature that is cooler than the sealing surface, and causing the plateau to displace plasticized plastic material of the film at least laterally along the weld seam, thereby compensating for the shape and dimensional tolerances, and maintaining film thickness in an inner peripheral region of the weld seam.

\* \* \* \* \*